United States Patent
Chapuis et al.

(10) Patent No.: US 10,832,603 B2
(45) Date of Patent: Nov. 10, 2020

(54) COMPUTERIZED PRODUCT DISPLAY SYSTEM AND APPARATUS FOR USE THEREWITH

(71) Applicants: June20, Inc., Hayward, CA (US); Bruce Samuel Finn, Akron, OH (US)

(72) Inventors: Paul Chapuis, Woodside, CA (US); Marc Andrew Meyer, San Francisco, CA (US); Bruce Samuel Finn, Akron, OH (US)

(73) Assignee: Converge Retail, Inc., Hayward, CA (US)

( * ) Notice: Subject to any disclaimer, the term of this patent is extended or adjusted under 35 U.S.C. 154(b) by 328 days.

(21) Appl. No.: 16/021,979

(22) Filed: Jun. 28, 2018

(65) Prior Publication Data

US 2018/0308399 A1   Oct. 25, 2018

Related U.S. Application Data

(63) Continuation of application No. 14/743,147, filed on Jun. 18, 2015, now Pat. No. 10,013,901.
(Continued)

(51) Int. Cl.
 *G09F 19/02* (2006.01)
 *G06Q 30/06* (2012.01)
(Continued)

(52) U.S. Cl.
 CPC ......... *G09F 19/02* (2013.01); *G06Q 30/0623* (2013.01); *G06Q 30/0641* (2013.01); *G09F 3/208* (2013.01); *G09F 9/00* (2013.01)

(58) Field of Classification Search
 CPC .. G06K 7/10722; G06K 7/10772; G06K 7/14; G06K 7/1478
(Continued)

(56) References Cited

U.S. PATENT DOCUMENTS 7,701,339 B2   4/2010   Irmscher et al.
8,401,915 B1   3/2013   Kim
(Continued)

FOREIGN PATENT DOCUMENTS

KR   10-20130023520 A   3/2013

OTHER PUBLICATIONS

International Search Report and Written Opinion dated Sep. 30, 2015, in International Application No. PCT/US2015/036828.
(Continued)

*Primary Examiner* — Edwyn Labaze
(74) *Attorney, Agent, or Firm* — Vierra Magen Marcus LLP

(57) ABSTRACT

Disclosed herein is an apparatus for use with a tablet computer type electronic device including a frontside having a touchscreen electronic display and a backside having a sensor that can be used to capture data from product cards or products positioned at one or more places on a display stand. The apparatus includes a frame to hold the tablet computer type electronic device. A first mirror is coupled to the frame at a first location adjacent to the sensor on the backside of the touchscreen electronic display when the frame is holding the tablet computer type electronic device. A second mirror is coupled to the frame at a second location offset from the first location. The first mirror and second mirror enable the sensor on the backside of the touchscreen electronic display to capture data from product cards or products when the data is adjacent to the second mirror.

20 Claims, 19 Drawing Sheets

Related U.S. Application Data

(60) Provisional application No. 62/015,299, filed on Jun. 20, 2014.

(51) Int. Cl.
  *G09F 9/00* (2006.01)
  *G09F 3/20* (2006.01)

(58) Field of Classification Search
  USPC ............. 235/462.41, 462.24, 462.11, 375
  See application file for complete search history.

(56) References Cited

U.S. PATENT DOCUMENTS

| | | | |
|---|---|---|---|
| 2006/0227099 A1* | 10/2006 | Han | G06F 3/039 345/156 |
| 2009/0109130 A1 | 4/2009 | Murphy et al. | |
| 2011/0187531 A1 | 8/2011 | Oehl et al. | |
| 2012/0005222 A1 | 1/2012 | Bhagwan et al. | |
| 2012/0232937 A1 | 9/2012 | Calman et al. | |
| 2013/0117153 A1 | 5/2013 | Shen | |
| 2013/0117163 A1 | 5/2013 | Danzig | |
| 2014/0310056 A1 | 10/2014 | Alapati et al. | |
| 2015/0371321 A1 | 12/2015 | Chapuis et al. | |
| 2016/0132822 A1* | 5/2016 | Swafford | A47F 1/126 705/28 |

OTHER PUBLICATIONS

International Preliminary Report on Patentability dated Dec. 29, 2016, in International Application No. PCT/US2015/036828.
Restriction dated Oct. 5, 2017, in U.S. Appl. No. 14/743,147, filed Jun. 18, 2015.
Amendment dated Oct. 30, 2017, in U.S. Appl. No. 14/743,147, filed Jun. 18, 2015.
Office Action dated Nov. 30, 2017, in U.S. Appl. No. 14/743,147, filed Jun. 18, 2015.
Amendment dated Feb. 26, 2018, in U.S. Appl. No. 14/743,147, filed Jun. 18, 2015.
Notice of Allowance dated May 23, 2018, in U.S. Appl. No. 14/743,147, filed Jun. 18, 2015.
Gartner, "Sliding Monitors", https://web.archive.org/web/20130607163354/http:www.michaelgartner.com/, Dated by web.archive.org at Jun. 7, 2013, pp. 1-5) Accessed Nov. 21, 2017 (Year: 2013).

* cited by examiner

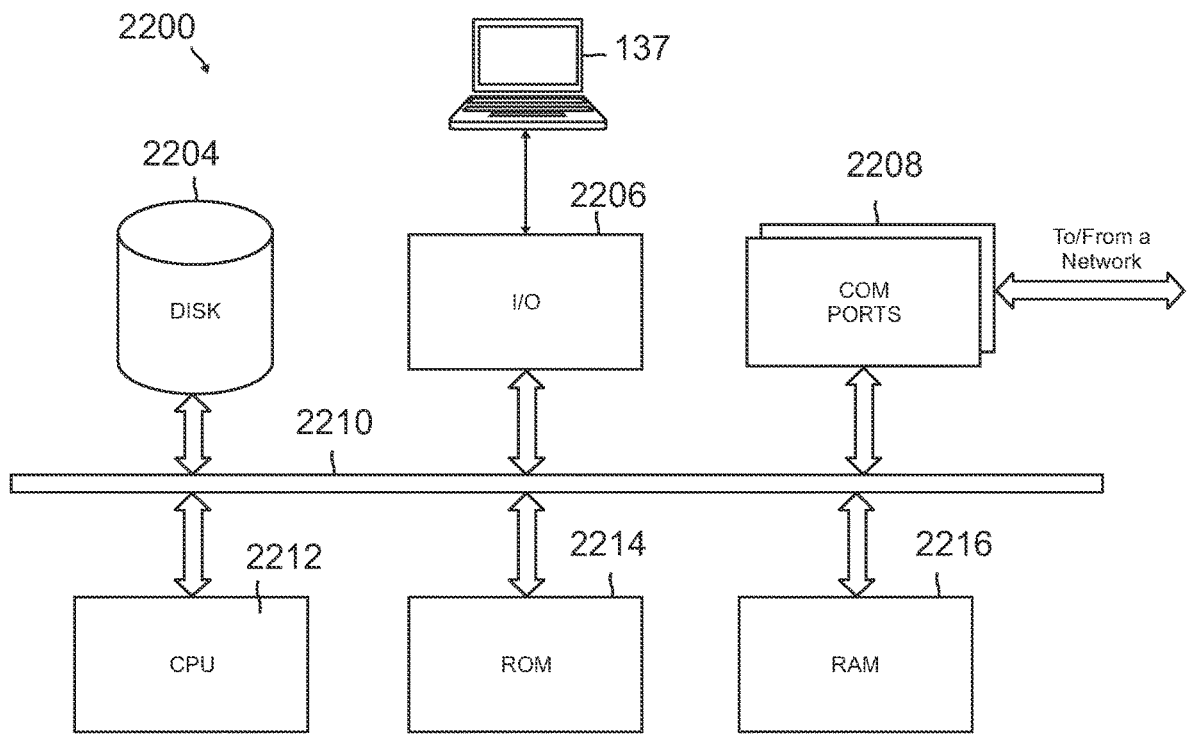
FIG. 28
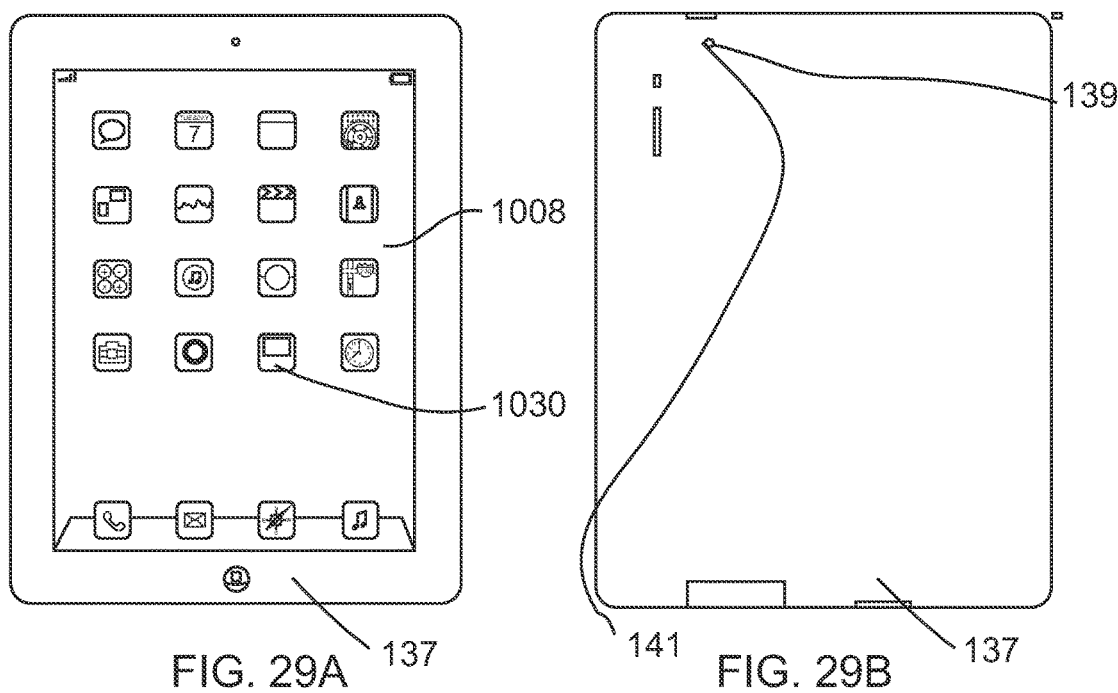
FIG. 29A
FIG. 29B

COMPUTERIZED PRODUCT DISPLAY SYSTEM AND APPARATUS FOR USE THEREWITH

PRIORITY CLAIM

This application is a continuation of U.S. patent application Ser. No. 14/743,147, filed Jun. 18, 2015, which issued as U.S. Pat. No. 10,013,901 on Jul. 3, 2018, titled "COMPUTERIZED PRODUCT DISPLAY SYSTEM," which claims the benefit U.S. Provisional Patent Application No. 62/015,299, titled "COMPUTERIZED PRODUCT DISPLAY AND METHODS OF RENDERING AN ENHANCED AUGMENTED REALITY PRODUCT DISPLAY EXPERIENCE," filed Jun. 20, 2014. Priority is claimed to each of the above applications, and each of the above applications is incorporated herein by reference in its entirety.

BACKGROUND OF THE INVENTION

1. Field of the Invention

Aspects of the present disclosure relate generally to computer assisted product display systems and interactive methods involving software to visualize products in a retail environment.

2. Description of Related Art

Notwithstanding the rise of online shopping, physical product displays are still an integral part of the retail shopping experience for consumers. In any retail store environment, consumers still desire to touch, feel, hold and test products before they decide on a purchase. As demonstrated by the success of Apple™ stores, shoppers still appreciate the experience of visiting physical stores and viewing and testing products in-person with the option of speaking to a knowledgeable sales-person to help them guide their product selection. For this reason, retail stores like Apple™, BestBuy™, and others have invested heavily into product displays that allow consumers to view and demonstrate products that are tethered to displays with locks and other security apparatuses.

However, stores invest considerable resources to secure products to product displays, which typically requires purchasing security devices that prevent consumers from removing, mishandling or misplacing display products. These displays and security devices can be awkward, bulky, and can easily be mishandled by consumers and retail store personnel, leading to unnecessary expense and work associated with creating a product display. Retail stores also have significant limitations with existing product displays which are expensive to build, time consuming to customize, adjust, remove or reconstruct when new product models become available. Traditional product displays can also take up significant store retail space if the products are particularly large such as appliances, furniture or household or outdoor equipment.

Moreover, sensitive or expensive equipment such as electronics, watches or jewelry can often be damaged or stolen if not properly secured or if the security or tethering apparatus is not installed properly, malfunctions or is tampered with. Such tethering and security devices, even if allowing a consumer to hold the object, although with limited mobility, still do not provide a consumer or shopper with a full experience of what the product looks or feels like in all physical and spatial dimensions. Moreover, such displays limit how a consumer can interact with the product, touch the product, test or wear the product, if it is wearable object.

Also, current computer assisted models of retail shopping do not present a seamless and easy-to-use system for the consumer. For example, U.S. Pat. No. 7,681,790, "Computer Supported Retail Shopping Systems and Methods" discloses a hand-held scanner for a customer to scan product information while shopping. However, this system requires that a store carry hand held scanners, check out those scanners to consumers, and have a consumer walk around the store scanning items. The system has obvious limitations such as requiring stores to check out scanners which can lead to theft and breakage. Also, the store must separately maintain a kiosk with personnel to check out scanners to consumers.

Other computer assisted models, e.g., U.S. Pat. No. 5,970,471, "Virtual catalog and product presentation method and apparatus" include having computers at a kiosk or near the product at a retail store which are Internet enabled and allow a consumer to browse online product catalogs, compare products and visualize various product images. However, this computer assisted virtual catalog is a stand-alone system and is not connected directly with the user's experience with the product, nor is it designed to scan products or product information in a product display setting where the user can interact in real time with a product or product display cards.

Tablet computers, miniaturized computers and smartphones are changing the way consumers interact with the world. However, retailers and product display makers have been unable to take advantage of next generation computing devices to enhance a retail store environment, a product display and take advantage of the full range of features available on tablet computers and smartphones to enhance a consumer's experience in a retail environment. Also, recent advances in virtual or augmented reality software are changing the way that physical objects, and images can be brought to life in an interactive manner, enriching the ability of the consumer to view objects in an augmented reality fashion. For example, Qualcomm's® Vuforia™ software platform enables augmented reality application experiences that allow image and objects to be transposed into virtual environments. For example, Vuforia™ and other similar software platforms allow static pictures or videos to be altered to include graphics, interactive video, or allow objects to become a part of a user's augmented reality. This can be achieved by configuring the software to allow a visual rendering of a static image or object to spring to life in a picture or live video by having the object captured in image and transposed in a real time video or a picture environment that includes the consumer's environment or the consumer himself. In other words, augmented reality or AR allows overlaying an object onto another object or target, in which case the overlay integrates into the target or can surround or become a part of the target's environment while the original screen remains visible while some aspects are altered. Vuforia and other applications like it open up a tremendous possibility for tablets and mobile devices to act as virtual displays for products while adding the additional feature of AR. For example, Vuforia and other applications allow consumers to take pictures of an image such as a watch or item of jewelry and then render the image on their hand or display, or take an item of furniture and render the image or video in the consumer's actual family room.

However, in retail display setting, the average consumer does not have the time, capability or interest to download software applications, install them on their tablets or smartphones, and configure them to render products on computerized displays or in an augmented reality fashion for video, display or otherwise. Also checking out scanners or walking around the store with a tablet or smartphone is impractical and does not offer a hands-free shopping experience. Shoppers may be pushing carts, carrying purses or bags, their cell phones or tablets and may not have the ability to carry yet another object when they arrive at the store. Moreover, a consumer visiting a retail store needs a seamless experience to view and handle a product without having to bring his own smartphone or tablet to a retail store and figure out how to interact with a product display. Also, in practice if a user does attempt to use a tablet or smartphone to interact with a product display, product or inanimate object, it will often produce a jittery and shaky experience as a result of the tablet or smartphone being an imprecise distance from the object, due to the user's motion, or as a result of not being configured properly to capture the object image or triggering symbol to render appropriate information to the consumer.

What is needed, therefore, is a computer assisted retail display platform that can easily and inexpensively be customized for a retail store to enhance a product display experience for a consumer and one that allows a consumer to use a display integrated computing device to interact with a product display in a manner that permits the consumer to experience a full range of products and product features.

SUMMARY OF THE INVENTION

An embodiment of the present invention is a system for displaying information on one or more products or services to a shopper using an easily-controlled system for selecting the displayed information. The system uses a computer display device capable of retrieving information from local or remote memory for display in response to commands or actions from a shopper. The user controls the computer display device by physical motion of the display in communication with one or more nearby display cards containing one or more triggering symbols representing a product or service of interest. The computer display device senses the selected trigger and displays information related to the selected product. The shopper may also select differing types of information using the touch capability of the computer display device.

One embodiment of the invention includes a variable product display system where the display device is secured to a display track on a product information display, and moves horizontally, vertically, or both directions in front of product display cards, and is further adjustable to move outwards towards the user.

One embodiment of the invention includes a display device selected from the group consisting of a tablet computer, a smartphone, laptop, or a wireless computing device.

In another embodiment of the invention, content to be displayed on the display device is selected from the group consisting of product information, images, media, graphics, product specifications, product reviews, product purchase user interfaces, web pages, icons, and videos.

In another embodiment of the invention, the display device is configured to provide an augmented reality rendering of a product in a user environment by taking images or video of products, product information and the user's environment and overlaying the product information in the user's environment.

In one embodiment, the display device is mounted on a support with handles which allows the user to grip the display device and move the display device along the track and over the product display cards.

A method embodiment of the invention includes the steps of displaying variable product information by mounting a display device arranged with a trigger sensor in a user movable positioning system, placing the positioning system in proximity to one or more product display cards arranged with one or more triggers, moving the display device with the positioning system such that the sensor perceives a trigger, and displaying content based on the perceived trigger.

In another embodiment, the display device is secured to a product information display and the product cards are arranged on said product information display.

In another embodiment the display trigger sensor is selected from the group consisting of a camera, motion sensor, or laser scanner.

In another embodiment of the invention, the trigger is selected from a group consisting of a product, symbol, logo, QR code, bar code, picture, image, serial number, product identification number, or product name.

In another embodiment of methods described herein, include the steps of activating an augmented reality application feature on the display device; capturing an image of a user environment through the sensor of the display device; and displaying an augmented reality product rendering on the display which features the product and the user environment.

In yet another embodiment, the product information application includes one or all of the following software applications: video module, audio module, text and graphics code, product purchase code, and product review code.

In another embodiment, the application triggering module activates an augmented reality application to render product information overlaid visually on the user's environment.

One embodiment of the invention describes a computerized product display article of manufacture, including: a product card with a trigger; an electronic sensor on an electronic display device secured to a product display, where said sensor is capable of sensing the trigger; said electronic display device further comprising non transitory computer readable media, including: a trigger processing module responsive to said trigger a product application triggering module responsive to said trigger processing module; and a product information application activated by said application triggering module to render product information This application describes use of a computer display device providing information on products and services. Where the description of the device uses the term product it also means an appropriate service, example: personal appearance enhancements, are also included in the meaning of a product.

BRIEF DESCRIPTION OF THE SEVERAL VIEWS OF THE DRAWINGS

A more complete understanding of the present invention can be obtained by considering the detailed description in conjunction with the accompanying drawings, in which:

FIG. 28 depicts the computer architecture of an exemplary computer display device according to certain embodiments of the invention.

FIG. 29A depicts a computer display device that can be used with embodiments of the invention. FIG. 29B depicts the rear side of a computer display device that can be used with embodiments of the invention.

DETAILED DESCRIPTION OF THE PREFERRED EMBODIMENTS

The detailed description set forth below, in connection with the appended drawings, is intended as a description of various configurations and embodiments, and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
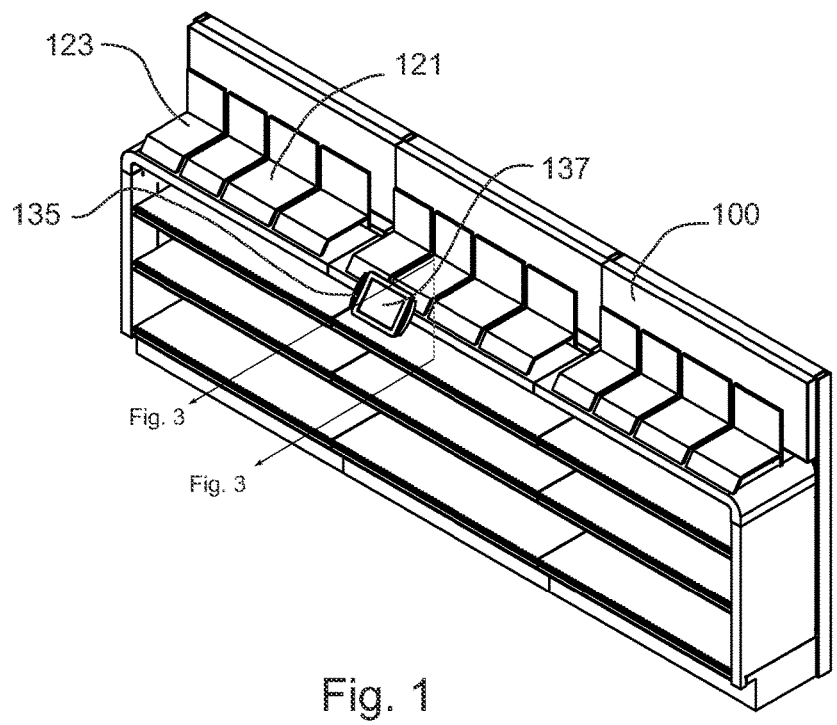
FIG. 1 is a perspective view of the variable product information display in a shelf mounted embodiment. The cross-section location of FIG. 3 is shown on the figure.
Figure 2:
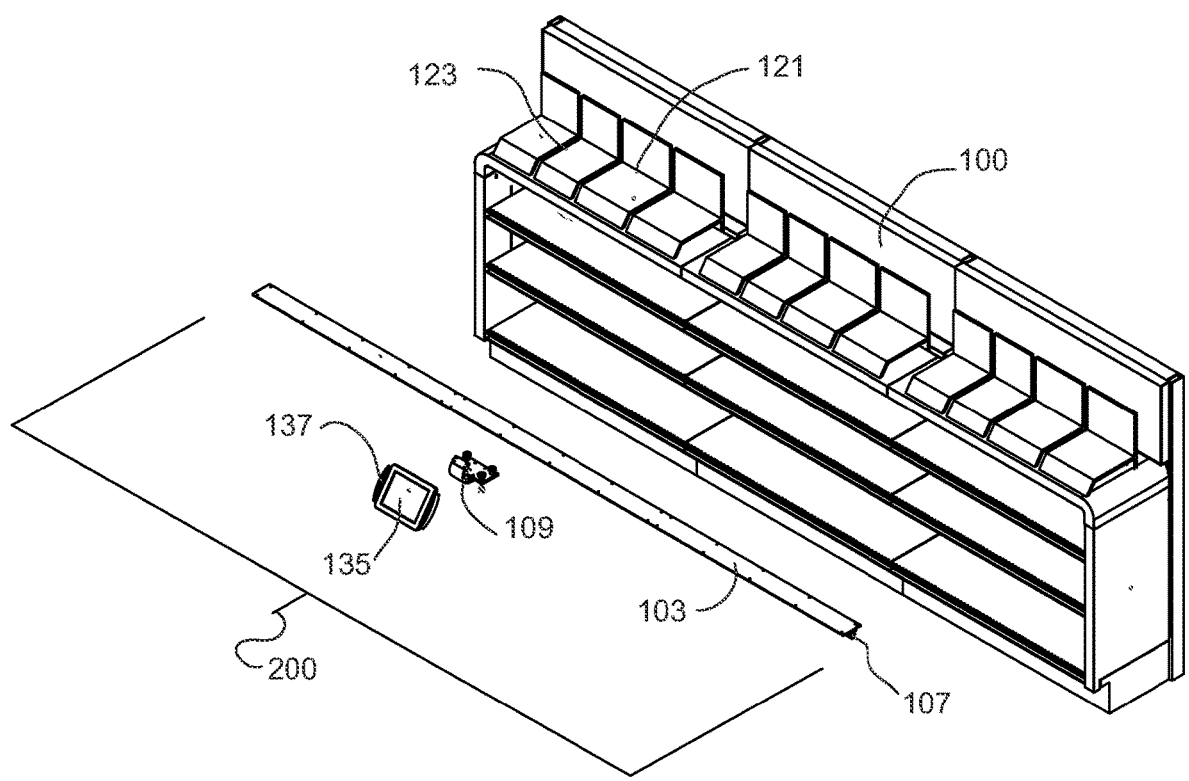
FIG. 2 is an exploded perspective view of the variable product information display in a shelf mounted embodiment.
Figure 3:
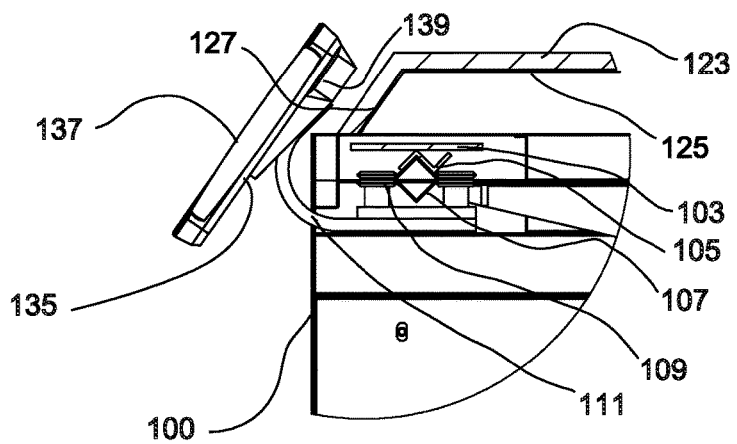
FIG. 3 is a cross-section of the variable product information display in a shelf mounted embodiment at the location shown in FIG. 1.

FIGS. 1 through 7 illustrate a shelf-mounted variable product information display 100 embodiment such as could be utilized in a retail store environment also providing access to packaged products on the shelves. The device as shown in FIGS. 1 and 2 includes one or more product display card covers which may be of various sizes. The figures show both large 121 and medium sizes 123. These covers are transparent to provide visual access to and protection of product display cards 125, as shown in FIG. 3.

Each product display card cover 121 or 123 is accessible to one or more display devices 137 contained in a frame 135 and that can sense when it is opposite at least one product display card 125. In the embodiment illustrated, the display device 137 is movably mounted to a positioning mechanism 200, as shown in FIG. 2. The positioning mechanism 200 in this embodiment consists of a display device frame 135 containing the device 137 and the linear track 107 to which the device 137 is connected. The mechanism, illustrated in FIGS. 2 through 4, allows linear motion in two directions, as shown by the arrows in FIG. 5. The mechanism 200 has the linear track 107 supported on the shelf by a bracket 105 connected to a mounting flange 103 attached to the shelf, which is the information display 100. The display device 137 frame 135 connects to a track follower 109 with multiple wheels configured to movably connect to and allow motion following the track in the two directions, as shown in FIGS. 3 and 5. Those skilled in the art will recognize the positioning mechanism 200 may be arranged to provide for additional degrees of motion, example x, y, and z.

Figure 6:
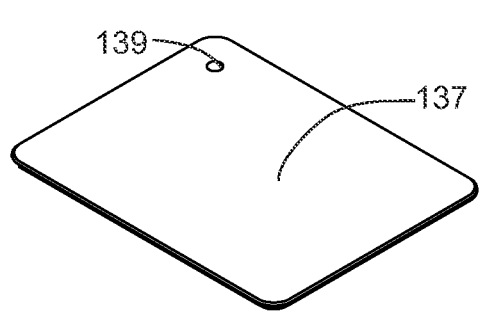
FIG. 6 is a perspective view of the rear of the computer display device.
Figure 7:
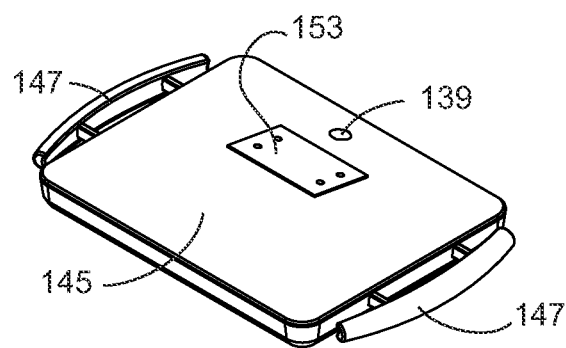
FIG. 7 is a perspective view of the rear of the computer display device frame base.

The product display cards 125 include illustration and identifying and descriptive information on one or more products to enable the user of the variable product information display to determine the range of products featured in product display cards 125 and to select a product for which additional information is desired. The cards 125 contain a product display card trigger 127 which may be any indicator recognizable by the display device, e.g. symbol, number, sign, logo, picture, barcode, SKU number, QR code, etc. The display device trigger sensor 139 in this embodiment is at the display device 137 side opposite the electronic display/touchpad 143, which is indicated in FIGS. 3, 6 and 7. The trigger sensor 139 is positioned opposite the portion of the display card 125 containing the trigger 127 as shown in FIG. 3. In the embodiment shown the cards are configured to allow motion in two linear directions to correspond to the positioning mechanism 200. Alternate configurations, including non-linear, example curved, configurations may be used where the positioning mechanism 200 can follow the shape.

Figure 4:
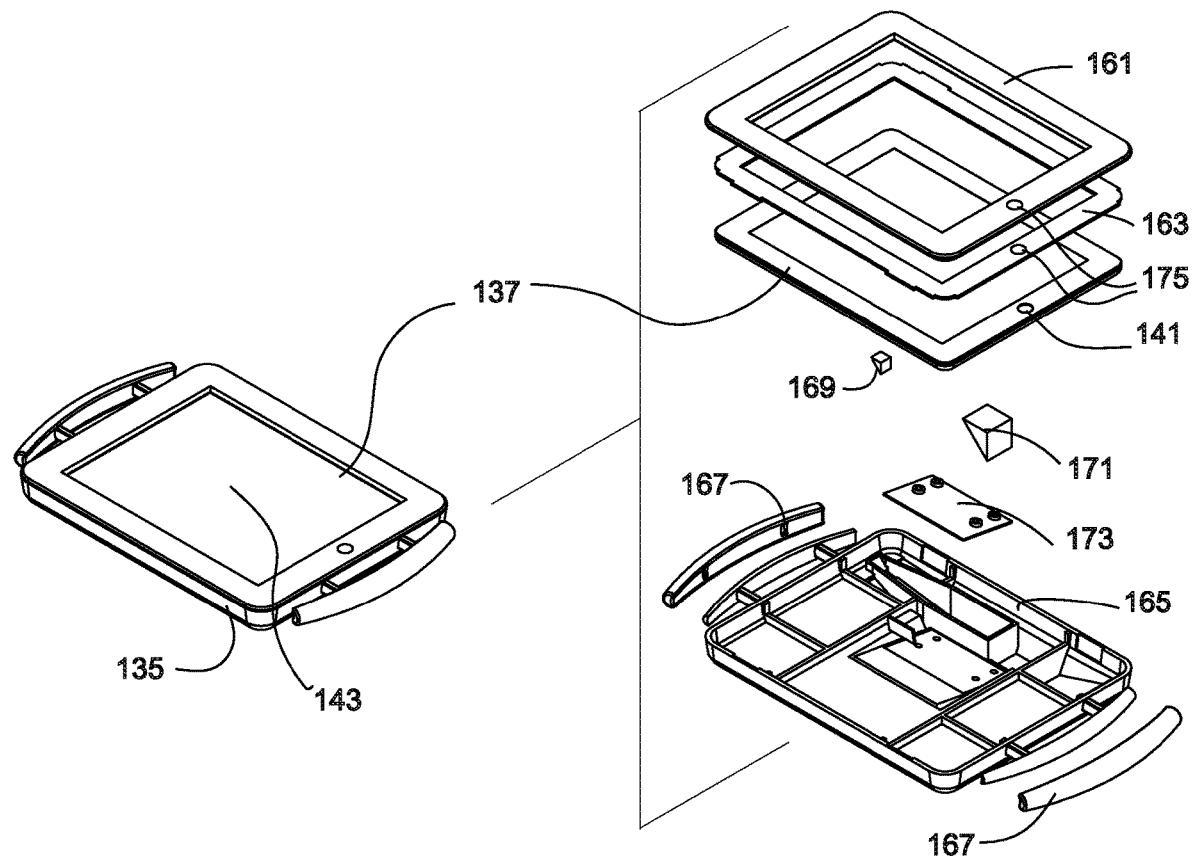
FIG. 4 is a perspective view of the product display and frame and an exploded view showing the components of the frame.
Figure 5:
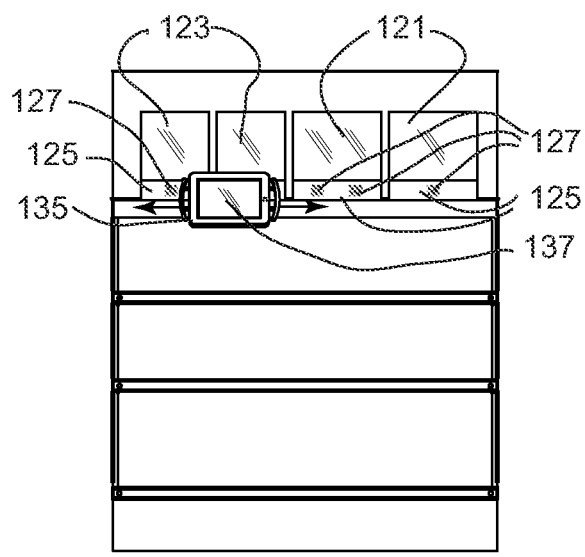
FIG. 5 is a front plan view of the variable product information display in a shelf mounted embodiment illustrating the relationship of the computer display device and the product display card providing information that can be recognized by the computer display device.

The display device 137 shown in FIGS. 4, 6 and 7 for this embodiment is a tablet computer. Those skilled in the art will recognize that the capabilities in this embodiment may be implemented by a large variety of digital computing devices including general purpose or dedicated devices which may use memory storage and processor internal to the device, or external, or both. The description is not intended to limit the invention. A tablet computer is battery powered, which may be charged by wire incorporated in the display device positioning mechanism 200, or by wireless inductive means, or by periodic replacement of a discharged battery with a charged one. Alternate embodiment devices may use a wired low voltage power supply.

The display device 137 features an electronic display/touchpad 143 encased in a frame 135 that has a top cover 161, and top cover insert 163 enclosing and protecting the area of the display device 137 outside the electronic display/touchpad screen. Alternate embodiment devices may use separate display and touchpad areas. The display device 137 is inserted in a frame base 165 that encloses the device 137. The frame base 165 may include a small mirror 169 and large mirror 171 contained in a channel in the frame base 165 that provides relocation of the display device trigger sensor 139 location and. This embodiment moves the trigger sensor location 139 from the back camera, the side opposite the display, of the tablet type computer, as shown in FIG. 6, to a more central location as shown in FIG. 7. This allows locating the display device 137 center on a product display card trigger 127 to activate the desired product information. An attachment plate 173 may be used for reinforcing the frame base 165 attachment to the track follower 109. The top cover 161, and top cover insert 163 are attached to the frame base 165, providing visual access to the display device electronic display/touchpad screen. A user camera opening 175 may also be provided in the top cover 161, and top cover insert 163 to allow use of the user camera opening 175 for device input.

The display device 137 is user movable to the location of one or more display cards 125 where the trigger sensor 139 perceives a display card trigger 127 which causes the display device to provide information on the product represented by the product display card 125. The information presented may then be varied by providing differing product display cards 125 which represent differing products, services, or variations on the product or service.

The display device 137 in connection with the product display card 125 performs the following steps: (1) utilizes a sensor to recognize a product card 125 or product; (2) activates software on the display device 137 which renders on-screen to the user product images, media, graphics, product specification information or any other information or media that a manufacturer or retailer desires to display to the consumer; (3) seamlessly renders new product information if the user glides the display device 137 over another product card 125 or product.

Product Display Equipped with Adjustable Computing Device to Enhance Customer Interaction with Display The display apparatus according to embodiments of the invention described herein provide an enhanced product display experience for the consumer using a computing display device (e.g. tablet, smartphone, appropriately attached to a product display, and configured with the appropriate applications (product application software) to provide an enhanced consumer experience in interacting with products and product display cards. The computing device can be a conventional computing device that is adapted with applications according to the inventions herein to trigger information on products, multimedia, presentations, graphics, web pages and may also include the capability to augment a picture or video of a product (alone or with the consumer) with additional objects or information in the view field of the device. The computing display device may include a tablet computer that includes a sensor (such as, but not limited to a camera) that is able to trigger full screen applications such as web browsers, Adobe Flash™ media and other applications that provide a full screen experience on the product for the user and may also include the ability to render a real life video or picture of the product image in a virtual or altered reality environment on the display or an associated computer or screen.

The variable product information displays 100 according to embodiments described herein may consist of displays of any shapes and sizes, including rectangular, square, circular, oblong or any other shape which a retailer designs or has designed that is appropriately fitted with a display device 137 to provide an enhanced user experience as described herein. The display device can be installed on a track fitted to the product display which allows the computing device to glide smoothly or in an incremental fashion across specific products, product, cards or display materials that are on display. The track may also allow the computing device to move vertically and outward to adjust the position of the computing device in relation to the product display. FIGS. 8 through 18 depict various embodiments of product displays according to additional embodiments of the invention. The product displays can be customized for the particular retailer store depending on the store's layout and preference or the existing product displays can be used and retrofit the computing display device 100 according to embodiments described herein.

According to the embodiments of the invention described herein, the variable product information display 100 can be designed to obviate the need to display products themselves, or limit the number of products that need to be displayed. The display according to embodiments of the invention described herein has significant advantages for manufacturers and product retailers such as Walmart, BestBuy, Fry's Electronics, Target and many others that carry thousands of products and hundreds of product displays. For particular products such as electronics, appliances, jewelry, watches, etc. the retail store can utilize a product display configured with a computing device as described herein to display product information to a consumer in a clear, attractive and seamless fashion without having to resort to bulky and expensive displays equipped with security apparatuses. Traditional product displays can be expensive and time consuming to create and swap out with new products and models which are updated on a frequent and regular basis. The product display according to the embodiments described can be used with several different types of products and can be a customized and changed by simply changing the product cards associated with the product.

The variable product information display 100 can be attached to wheels that permits a retailer to easily move the display around and placed in such a fashion around actual products, posters, images, or demonstrations that create an enriching and interactive experience for the consumer while allowing the retailer to quickly adapt and adjust retail displays depending on product pipelines, popular product, or other considerations.

Figure 8:
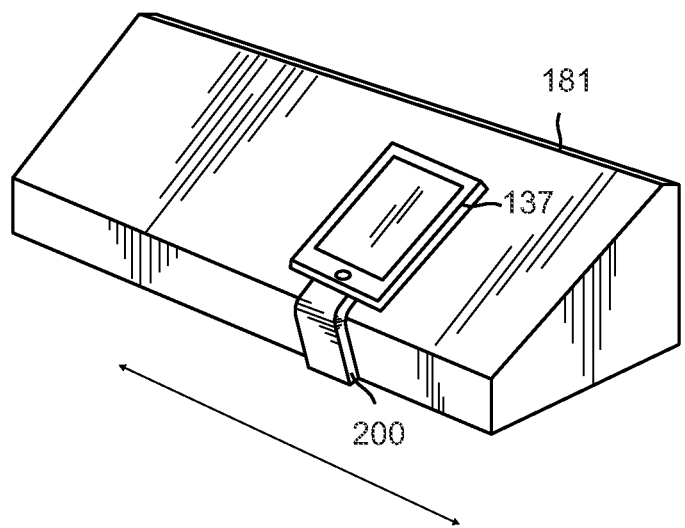
FIG. 8 is a diagram conceptually illustrating a product display with an attached moveable computer display device which slides in a horizontal fashion across a product display.

FIG. 8 discloses a variable product display 100 according to another embodiment of the invention. Consumer product display 100 includes product display stand 181, a display device 137 and a positioning device 200. The display device 137 is attached to the product display stand 181 by the positioning device 200, can slide in a horizontal fashion across the product display stand 181 using any conventional track assembly. The positioning device 200 may consist of that described previous or a bar or metal or plastic plate or of any other suitable material) which may be fixed either to the side, bottom or internal groove of the product display stand 181 with a track assembly which allows the support to slide along the product display stand 181. The track assembly may consist of a standard roller or wheel assembly where the wheels or roller ball or ball bearing assembly is built into a horizontal track that runs the length of the display stand 181. The positioning device 200 may attach to the track assembly by screws, nails, fasteners, welding, magnets, or other attachment means. One of ordinary skill in the art will understand that there are several ways to attach the support and computer display device to the product display stand in a manner that allows a user to move the computer display device along the length of the product display stand 181. In some embodiments, the track assembly may be motorized such that positioning device 200 can glide along the length of the display stand 181 by a motorized chain or other electrical mechanical device. Display device 137 may be attached to the positioning device 200 by a metal plate on the back side of the device that is screwed or held in place by a magnet, adhesive or other attachment device to keep the device securely fastened to the support.

Figure 9:
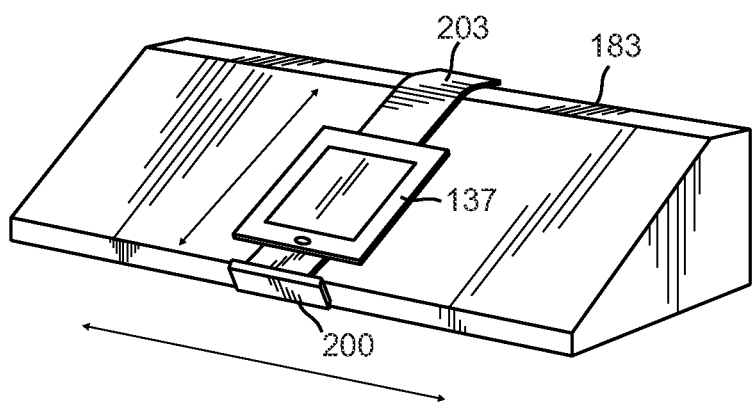
FIG. 9 is a diagram conceptually illustrating a product display with an attached moveable computer display device which slides in a horizontal and vertical fashion across a product display.

FIG. 9 depicts another embodiment of a variable product information display 100, with a display stand 183, display device 137 and positioning devices 200 and 203. In this embodiment, display device 137 is attached to the horizontal positioning device 200, but in an adjustable fashion to allow the computer display device to also move up and down, i.e., vertically along the support to position itself at various places along the product display stand 183, which, as will be described in further detail below, allows the display device 137 and its built-in sensor to capture data from product cards or products which are positioned at more places on the display stand. As described previous, the positioning device 200 can be attached to the display stand in any conventional means such as wheel or ball bearing assembly or by magnet or in way that permits the positioning device 200 to be securely fashioned to the display stand but at the same time slide along the length of the display stand 183. Display device 137 is also attached to the positioning device 200 with moveable track 203 in an adjustable fashion to allow it to move vertically, thus permitting a user of the display device 137 to slide it up and down the support with positioning mechanism 203.

Figure 10:
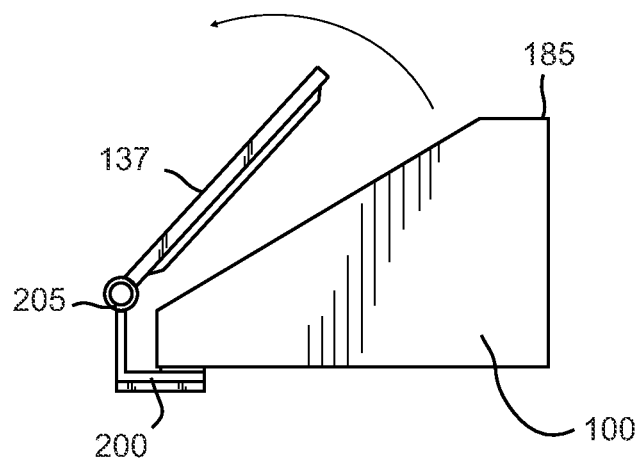
FIG. 10 is a diagram conceptually illustrating a product display with an attached moveable computer display device which adjusts outwards towards the user.

FIG. 10 depicts another embodiment of the invention, wherein product information display 100 includes a display stand 185, a positioning mechanism 200, and display device 137 attached to the positioning mechanism 200 and to an angular distance positioning mechanism 205. Display device 137 is adjustably attached to the positioning mechanism 200 by the hinge of the angular distance positioning mechanism 205, which allows it to pivot forward and backward with respect to the display stand 185. As described by reference to FIG. 1, the display device 137 is positioned with respect to the display stand such that it can capture data on product cards and products through its sensor(s), such as a camera on the back of the display device 137. The position of the display device 137 can be adjusted by the user to direct it to other portions of the display card, or to position it at the user. For example, by positioning the display device 137 outwards towards the user, the user can capture images of the user to render product images or video in an augmented reality image or video on the display device 137 screen.

Figure 11:
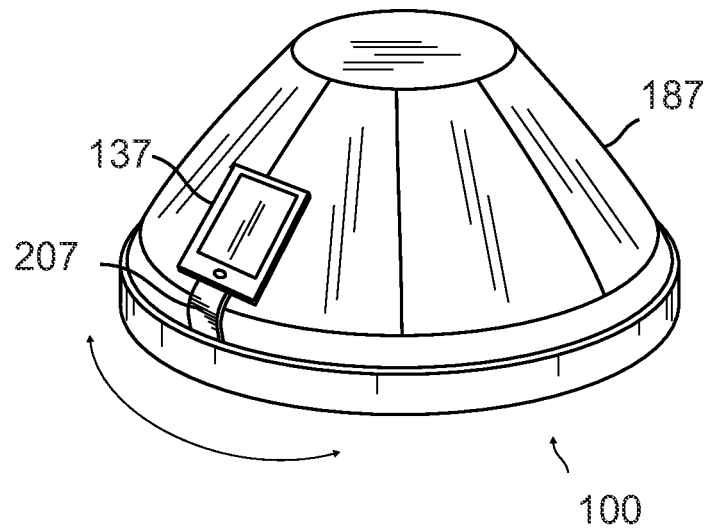
FIG. 11 is a diagram conceptually illustrating a product display with an attached moveable computer display device which rotates on a track in a circular fashion around a product display.

FIG. 11 depicts an embodiment of the product information display 100 invention wherein the product display 100 is designed in a circular and half-conical shape to permit a user to walk around the circular stand 187. The display device 137 is connected to the circular stand 187 through a support with a circumferential positioning mechanism 207 attached to the circular stand 187. The display device 137 is engaged with the circumferential positioning mechanism 207 in a manner which allows the accompanying display device 137 to rotate on the track around the stand 187. The display stand 187 may include product cards and products on display. The display device 137 is positioned at an optimal distance away from the product display stand to capture images or product information as its sensor rotates around the stand and captures different products or product cards on the circular stand 187.

Figure 12:
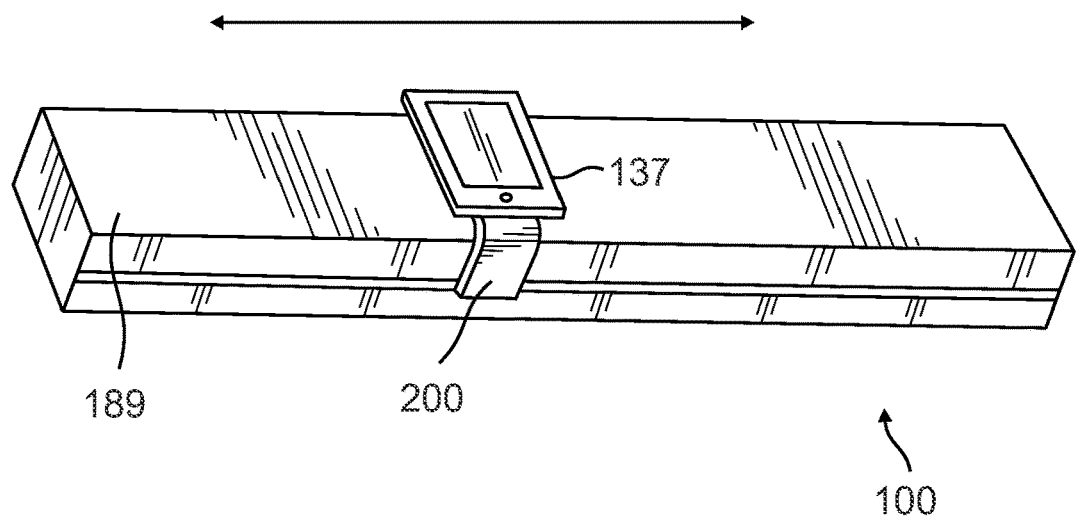
FIG. 12 is a diagram of an embodiment of a product display with an attached moveable computer display device which slides in a horizontal fashion.
Figure 13:
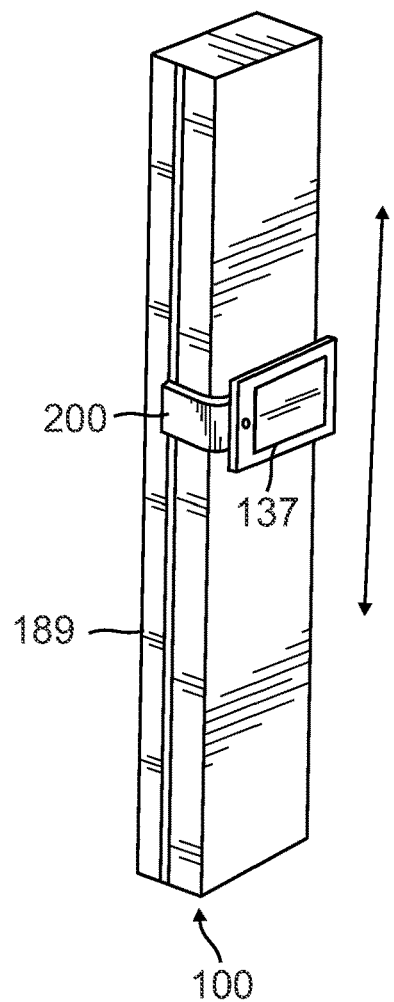
FIG. 13 is a diagram of an embodiment of a product display with an attached moveable computer display device which slides across a vertical product display.

FIGS. 12 and 13 depict two different versions of product displays according to embodiments of the invention. FIG. 12 depicts a horizontal variable product display 100 with a portable stand with integral track 189 and its accompanying display device 137 which slides across the stand with the positioning device 200 operating within the track. As previously described, the display device 137 is attached to the positioning device 200 which slides along the length of the product display 189. FIG. 13 depicts a vertical product display 100 with a portable stand with integral track 189 and its accompanying display device 137 which slides up and down the stand with the positioning device 200 operating within the track. The vertical product display 189 may be suitable for product displays where stands are erected in a vertical shelf fashion and products are displayed on vertically stacked shelves. In this manner, consumers can walk up the product display and move display device 137 up and down the length of the vertical product display stand 189 which may have shelves or product cards at different heights of the display stand 189.

Figure 14:
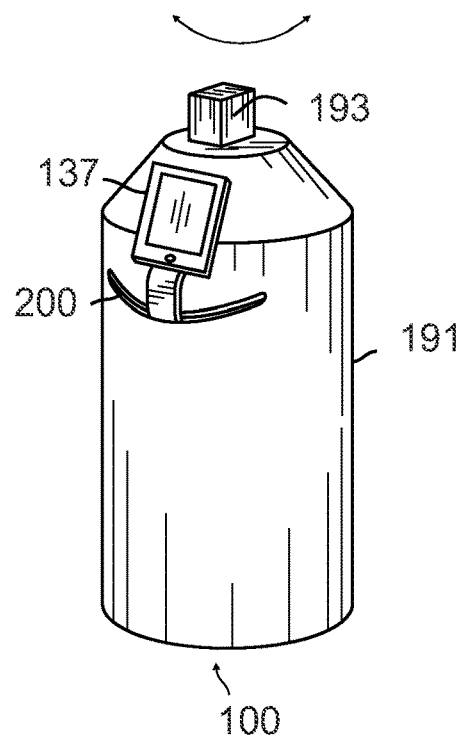
FIG. 14 is a diagram of an embodiment of a product display with an attached adjustable computer display device which slides across the product display in a circular fashion.

FIG. 14 depicts a product display 100 according to one embodiment of the invention which may be suitable for single product displays such as jewelry, fine watches or luxury items. In this protective product display embodiment 191, the display device 137 is attached to the product display stand 191, which may have at its center a product which may be enclosed behind glass or a protective enclosure 193 that may be rotating to show all sides of the product. The display device 137, as in other embodiments is attached to the display stand 191 by a positioning device 200. The display device 137 is positioned such that its sensor on the backside can detect the trigger and provide enhanced images, details or augmented reality visuals to the consumer while keeping the product protected and firmly attached to the product display stand 191.

A Product Display with Computer Interactive Product Cards

Figure 15:
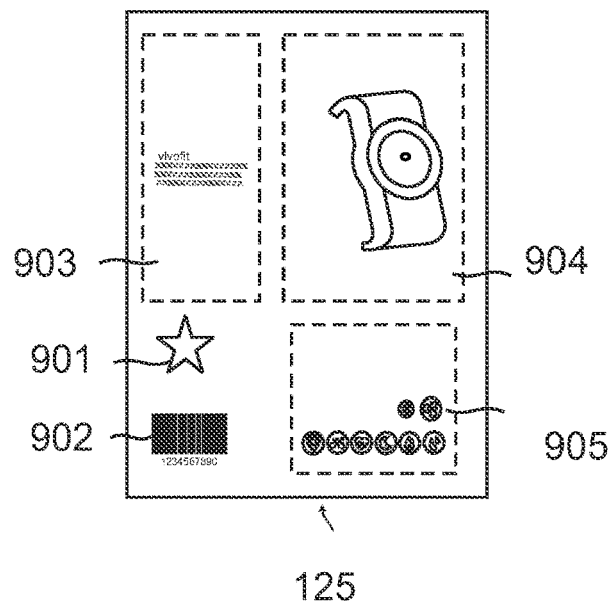
FIG. 15 depicts an embodiment of a product display card to be used with a computer display device according to one embodiment of the invention.

The product display card 125, shown in FIG. 15, may contain all the information that is necessary for the consumer to activate product information using a computer display device 137 that reads the product cards and renders information on the product, including images, video, augmented media, price information, availability, models, colors, specifications and any other information that the consumer desires. According to embodiments of the invention described above, the computer display device 137 can slide smoothly over a track hovering over any target associated with a product card. Upon recognition of the trigger or symbol on the product card by the sensor (example. camera or radio frequency receiver) on the computing device, information on the product, including pictures, multimedia, presentations, videos, etc. can be displayed to the user on the screen of the computing device. As the and its associated sensor move back and forth across the product or product card, information from the sensor may trigger the product application to change the on-screen product information depending on which product or product card the display device 137 is hovering over. For example, many products come in several different models, sizes, colors etc. With a product display that is focused on, for example, cameras, it may be necessary to only display a handful of primary camera models whereas product cards may be substituted for those models not displayed. Or, the retailer may decide to do away with displaying physical products altogether and substitute product cards in their place. In one embodiment, both a physical product and an associated product card are used in conjunction. The computer display device 137, as described below, can hover over that product card or product and a sensor on the computer display device 137 can capture the necessary symbol to trigger an application in the device which then renders an image and information on the various models, shapes and sizes of the particular product. The product display with the computer display device 137 is also conveniently designed so that the consumer can interact with a product display at an eye level appropriate to the height of the user by allowing the computer display device 137 to be adjusted both vertically and outward to allow the consumer the flexibility to position the display device 137 at the appropriate height or distance from the user. The display device 137 can be connected to the product display in any appropriate manner including on a moveable track that glides across the products or product cards in manner that allows the user to move the computer display device 137 over each of the products at his or her convenience.

FIG. 15 depicts a product card 125 according to one embodiment of the invention. The product card may include computer recognizable features such as a symbol 901 which can be any symbol, indicia, or code associated with a particular product or product model. It may also, or in the alternative, include a bar code 902 which would be specific to a particular product or product model and would be recognizable by display device 137 and its sensor 139. The product card 125 may also include product information 903, a product image 904, and product feature icons 905 which may also be displayed to the user of the display device 137 on a touch screen application to permit the user to then scroll through various features on the product.

Figure 16:
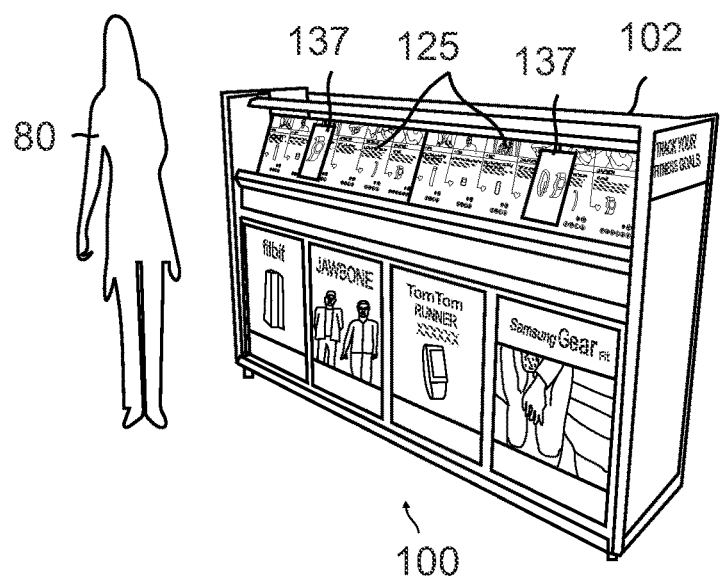
FIG. 16 depicts an embodiment of a product display with moveable computer display device and computer recognizable product cards.

FIG. 16 depicts an alternative configuration of the product display 100 system according to embodiments of the invention incorporating computer recognizable product cards with a computer enhanced product display. The system includes, for example, a product display 100 with product cards 125 as described in FIG. 15. The product display system also includes display device 137 as described in FIG. 8. The display device 137 is attached to a track and can move horizontally over product cards 125 by the actions of a user 80. The display device 137 has a sensor on the backside of the device, which as discussed herein, can detect logos, symbols, bar codes, QR codes or any other computer recognizable symbols to prompt the application on the computing device which displays product features. In this particular embodiment, wearable technology fitness device such as Fitbit™, Jawbone™, and Samsung Gear™ are featured on the product display stand 102. The products may be attached to the product card or optionally the display stand and product cards may not require displaying the actual devices which can be kept in storage. However, a user can use computer display device 137 to interact with the product cards 1003 to bring up rich and interactive product information on the computing device, including product specifications, videos, audio, reviews and options to purchase the product.

Figure 17:
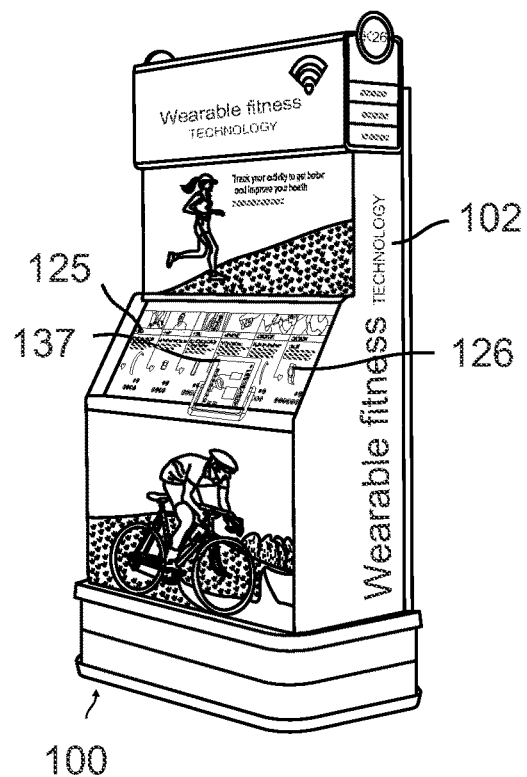
FIG. 17 depicts an embodiment of a product display with moveable computer display device with hand grip and computer recognizable product cards.

FIG. 17 depicts an interactive product display system 100 according to another embodiment of the invention. The product display system includes product display 100, product information on the product display cards 125, products 126, a display device 137 on an adjustable track. In this embodiment, the computer display device 137 may include a device holder with an adjustable hand grip.

Figure 18:
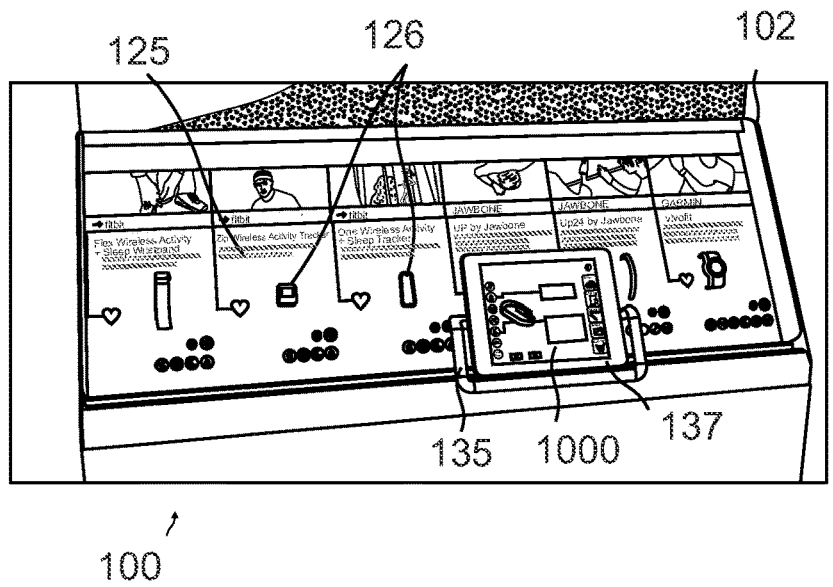
FIG. 18 depicts an embodiment of a product display with moveable computer display device with hand grip and computer recognizable product cards and products.

FIG. 18 is a more detailed depiction of an interactive product display system 100, which includes the product display stand 102, product cards 125, product devices 126, display device 137, device frame with handgrip 135, and interactive product application 1206 displayed on computer display device 137. As shown, computer display device 137 can be easily moved horizontally on a track along the product display stand 102 using the frame handgrip 135 in a fixed position in relation to the product cards 125, which are in a spaced apart distance with respect to the computer display device 137. As the computer display device 137 moves across the product cards, an object on the product card such as a symbol or logo associated with a particular product or model can be detected by the sensor on computer display device 137 to trigger application 1000 which features information on the product associated with the product card 125. This way the user may learn all about the product featured on the product card by interacting with the application 1000 without having to actually use or test the product.

Figure 19:
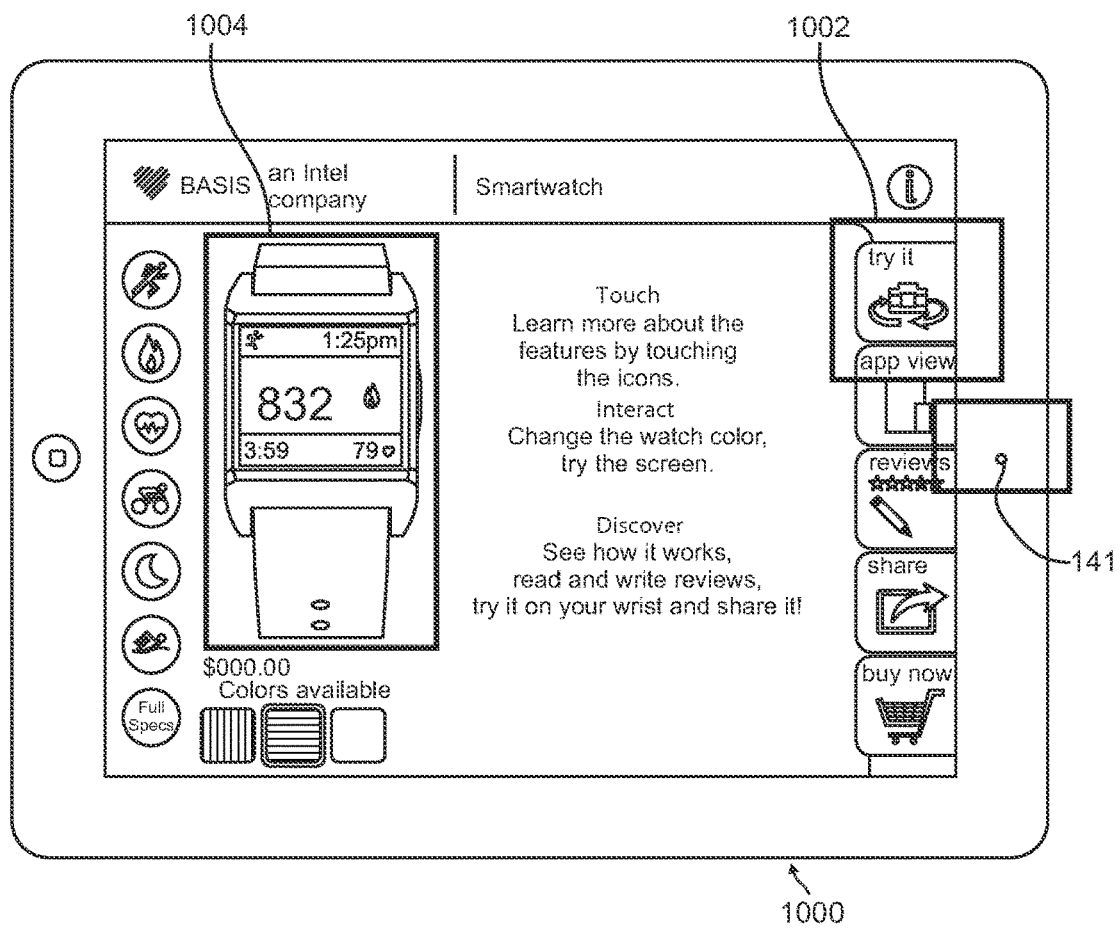
FIG. 19 depicts an embodiment of the user interface application of one embodiment of the invention showing a product rendering and an introduction to an augmented reality feature.

FIG. 19 depicts the application user interface according to one embodiment of the invention where the computer display device 137 triggers an application on a product from a product display system. This application program 1000 may include an augmented reality application feature 1002, shown here as a "try it" icon. The display device may also include a front camera 141 and a product rendering 1004. The product rendering 1004 is typically a two or three dimensional graphic or actual product picture of the product on the product display. However, if the user selects that augmented reality application feature 1002, it may trigger a completely new product immersion experience for the user by activating sensor 141 to include a visual of the product in actual use by the user.

Figure 20:
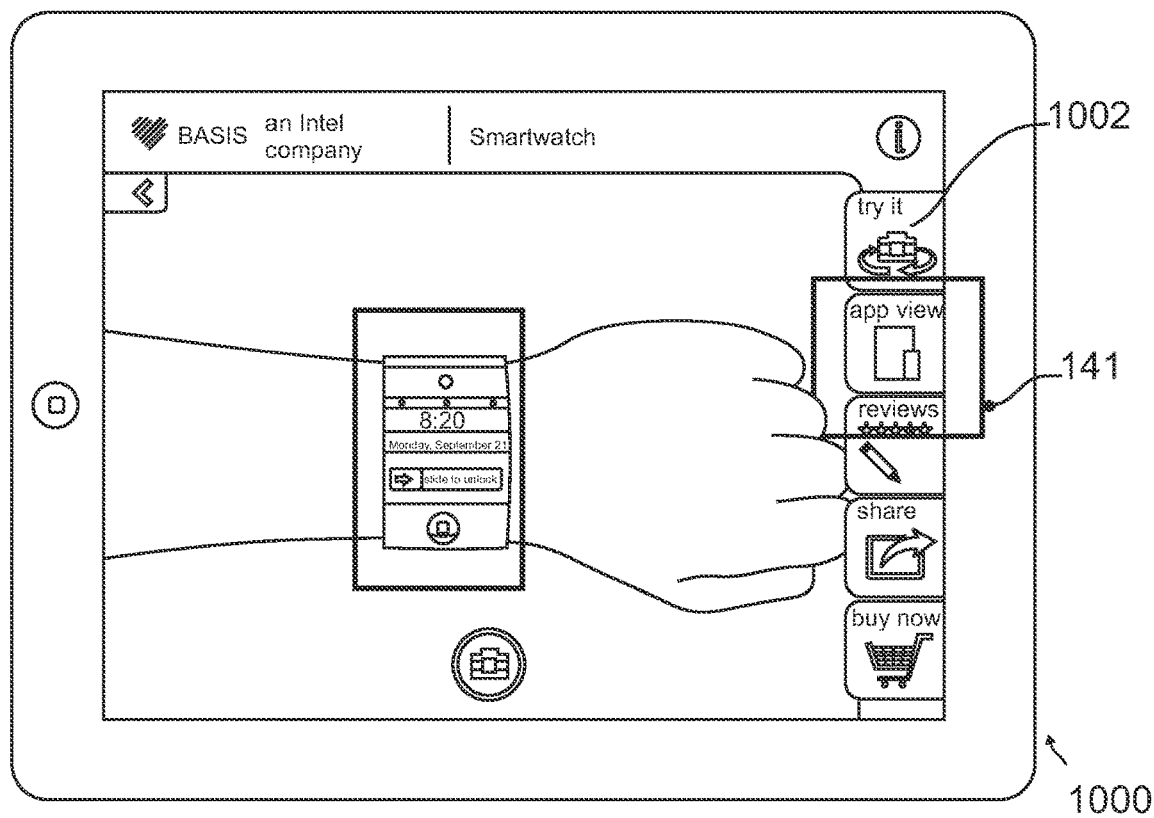
FIG. 20 depicts an embodiment of the user interface application showing an augmented reality display of a consumer product.

FIG. 20 depicts the application user interface according to an embodiment where the user has triggered an application program 1000 which includes the augmented reality application 1002 to render a product visual in a real world display. In this example, the user has initiated the augmented reality application 1002 feature, triggering camera 141 which begins rendering a picture or video of the user's arm with the product in question, in this case, a smartwatch, displayed on the user's arm. In this example, the application program 1002 is programmed to overlay a graphic or picture of the smartwatch on the user's arm, which the user can move freely in the range of the camera 141 and still see an overlay of the watch in three dimensions on the user's wrist. The user may twist his wrist, backwards, forwards or sideways and still see a rendering of the product visual on the user's wrist as displayed on the screen of the display device.

Figure 21:
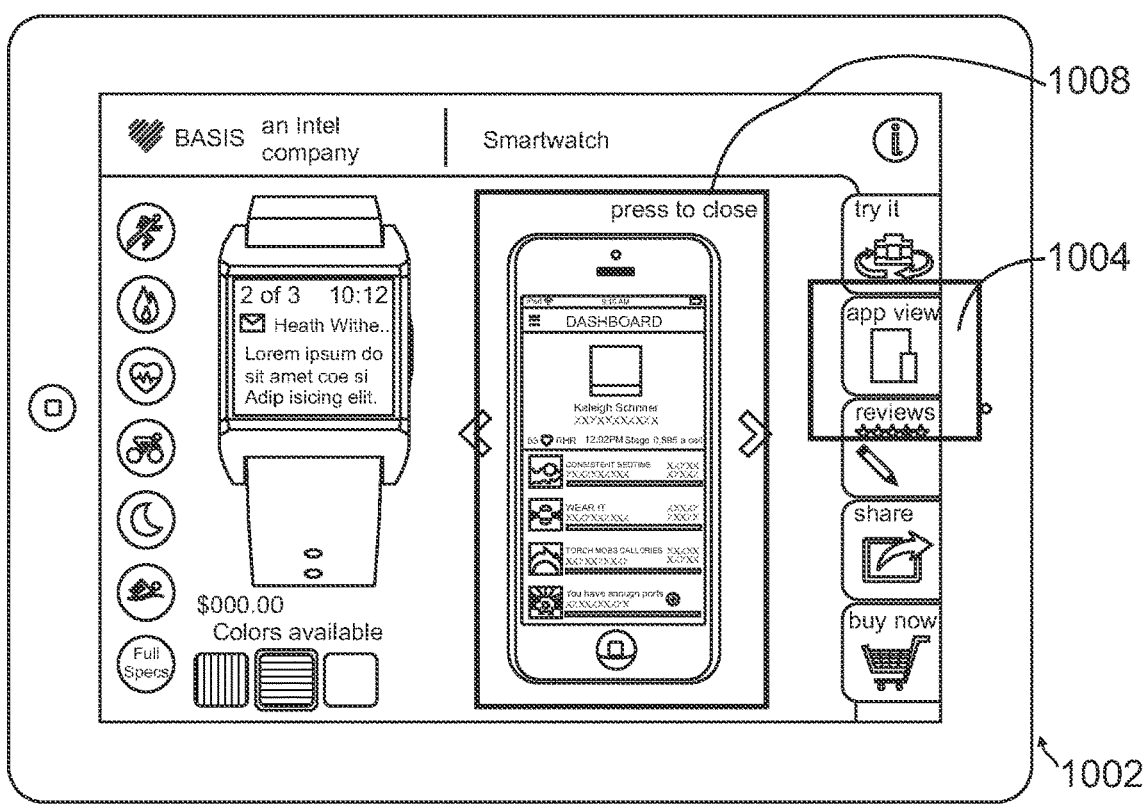
FIG. 21 depicts an embodiment of the user interface application showing a product rendering and a mobile application feature.

FIG. 21 shows additional features of application programming 1002 which includes product rendering 1004 and app view icon 1006. In this example, the user may trigger app view icon 1006 to render a display of the application user interface 1008 of the smartwatch product. The app view icon 1006 may be particularly interesting to the user as many electronic products have mobile, tablet or internet application features which are not necessarily shown on the product itself.

Figure 22:
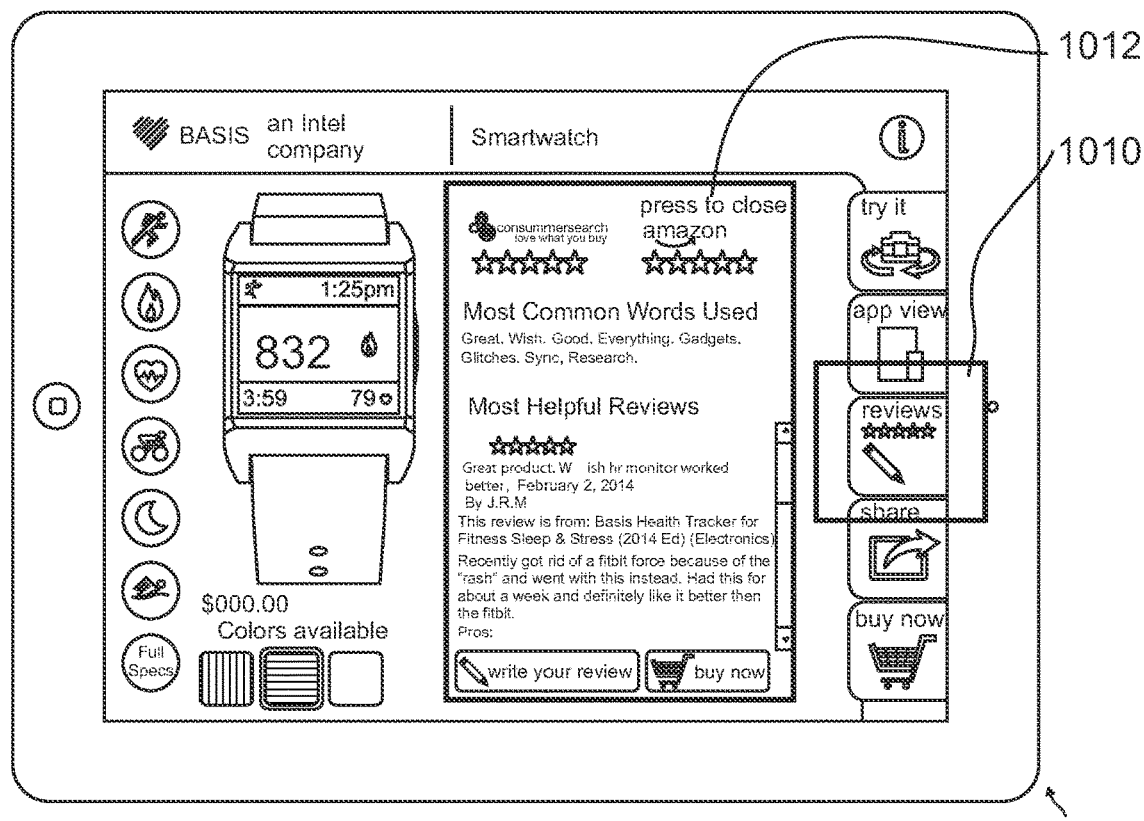
FIG. 22 depicts an embodiment of the user interface application showing a product review feature.

FIG. 22 shows additional features of application programming 1000 which includes additional features such as a product review icon 1010 and product review section 1012. This application features allows users to view product reviews from actual consumers of the product while viewing a product at a product display according to embodiments of the invention herein.

Figure 23:
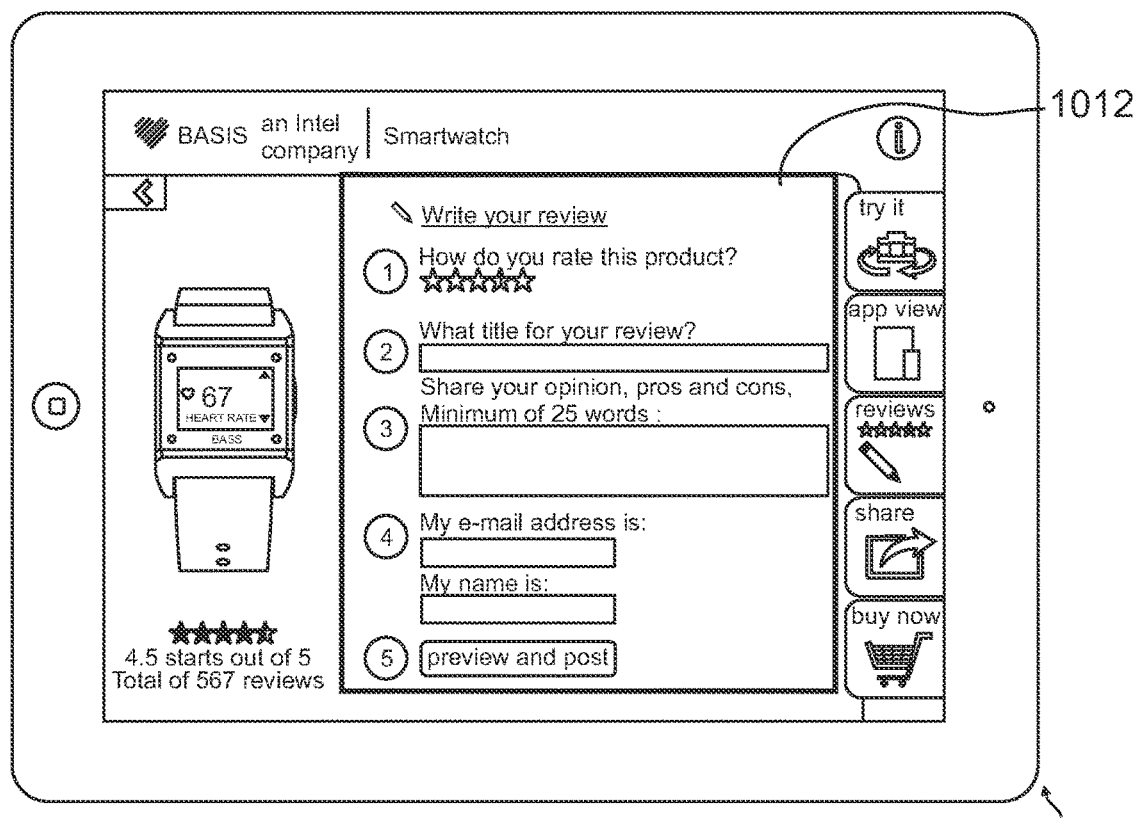
FIG. 23 depicts an embodiment of the user interface application showing a product review field.

FIG. 23 shows application programming 1000 including product review filed 1701. This feature allows a user to rate a product at the product display stand and contribute to the product reviews for a particular product.

Figure 24:
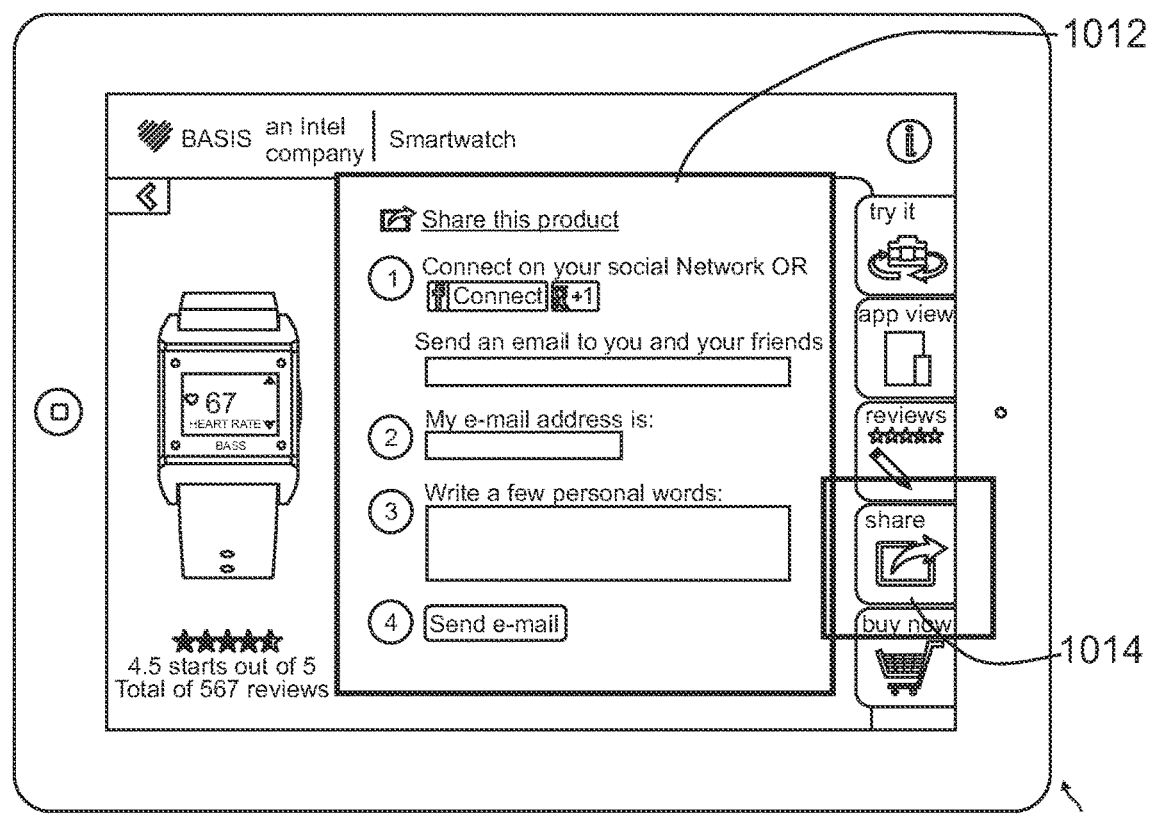
FIG. 24 depicts an embodiment of the user interface application showing a share feature.

FIG. 24 shows application programming 1000 which includes a share feature 1012. This application features allows a user to share a product review directly from the product display by activating the share feature 1014 icon and sending the product review to email addresses or posting the product review on social media sites.

Figure 25:
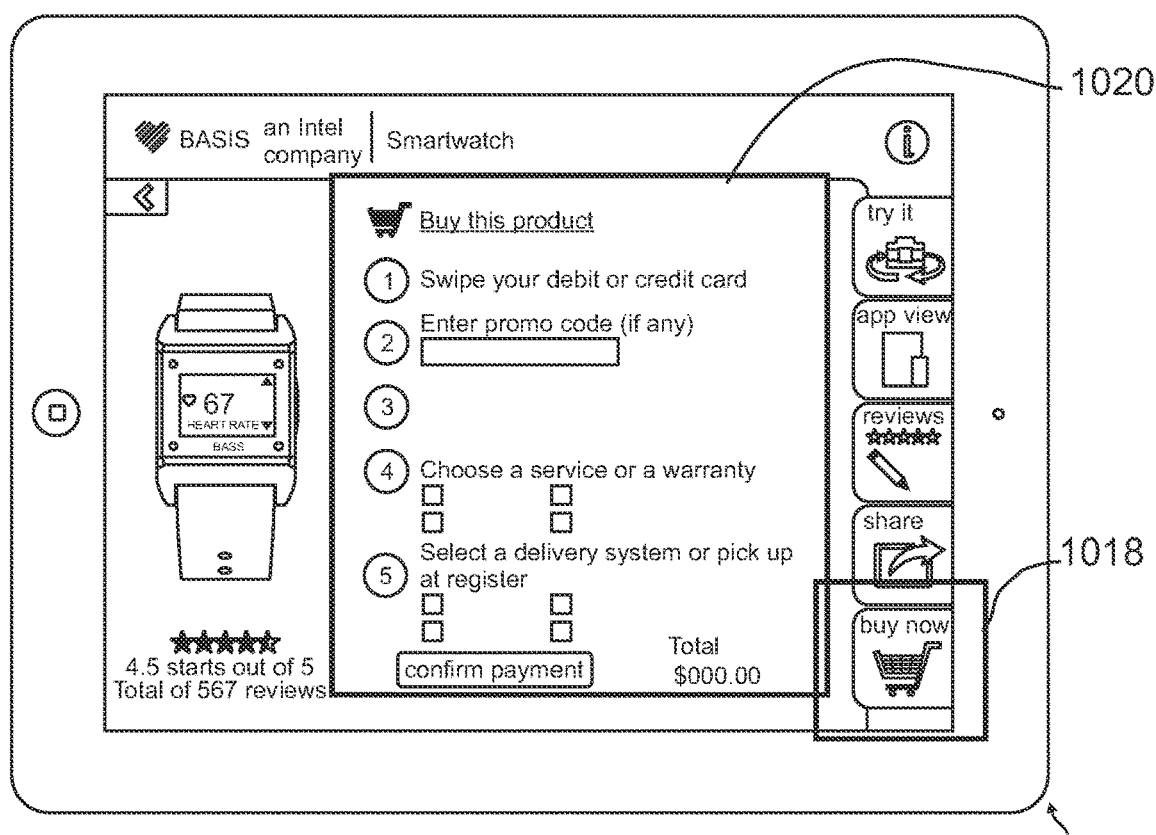
FIG. 25 depicts an embodiment of the user interface application showing a product shopping cart feature.

FIG. 25 shows application programming 1000 which includes a buy icon feature 1018 and buy fields 1820. Using this exemplary user interface, a user can directly purchase a product on display from a product display stand.

Figure 26:
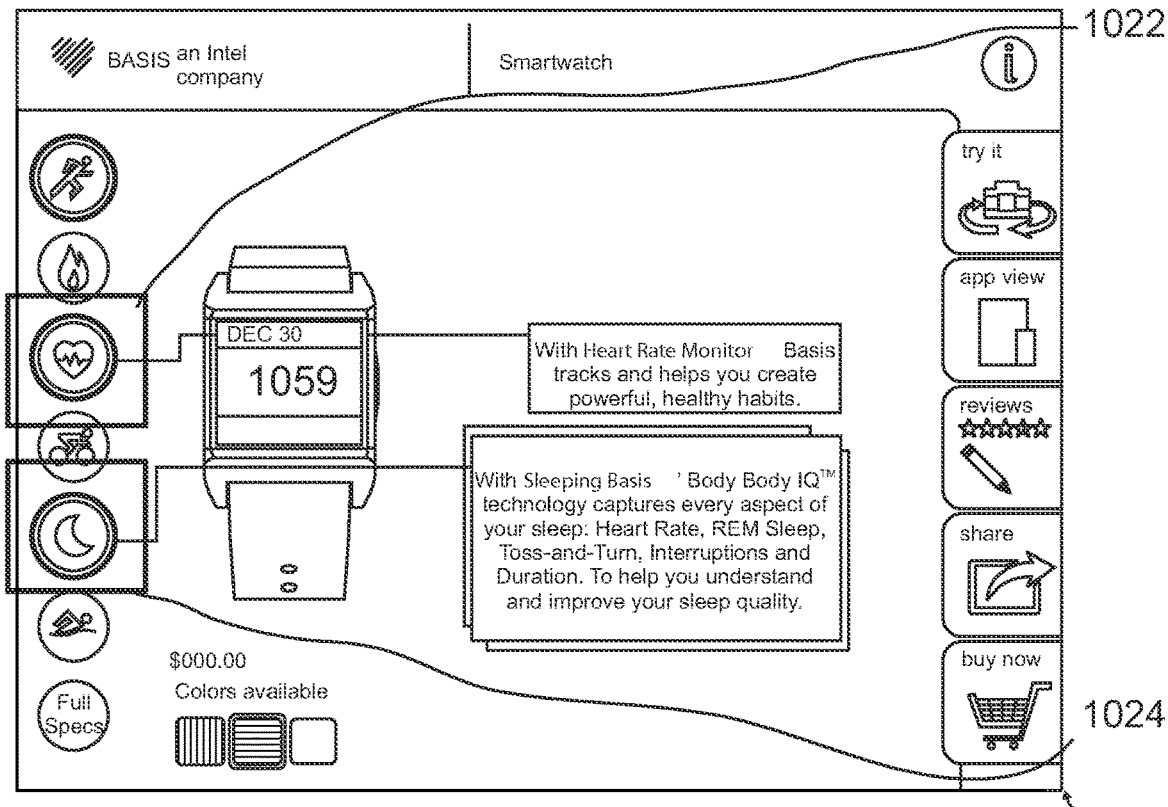
FIG. 26 depicts an embodiment of the user interface application showing product feature icons.

FIG. 26 shows application programming 1000 which includes additional information and user icons on various product features of displayed products. In this particular example, smartwatch product features are depicted with icons 1022 and 1024. When these icons are activated by the user it displays information on features of the product, in this example the heart rate monitor 1024 and sleeping basis 1026.

Figure 27:
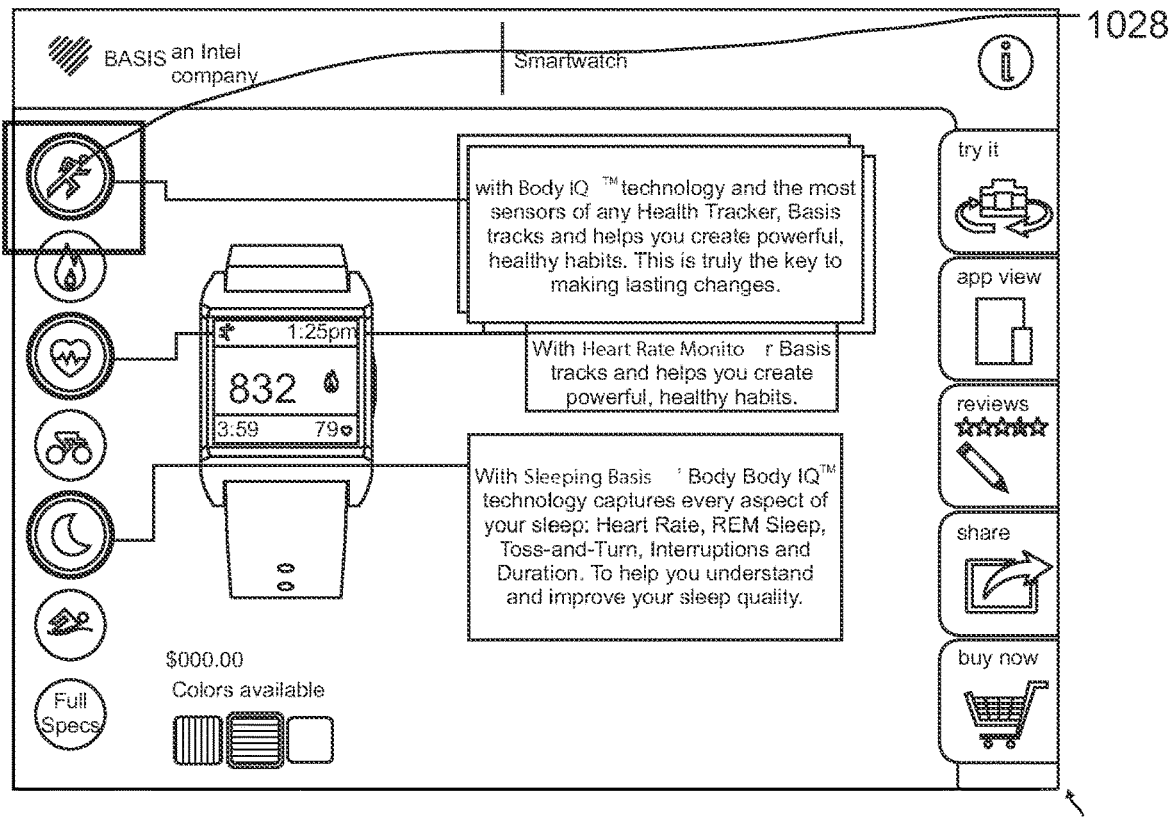
FIG. 27 depicts an embodiment of the user interface application showing additional product feature icons.

FIG. 27 shows an additional product features which can be activated by the user. Body IQ Icon 1028 depicts product features of a fitness tracker feature.

FIG. 28 depicts a computer architecture 2200 of a computer display device 137 on which the present computer display device 137 and other references to computing devices in the previously described figures can be implemented. Computer architecture 2200 includes a functional block diagram illustration of a computer hardware platform which includes user interface elements. The computer display device 137 may be a general purpose computer, a special purpose computer, a tablet or smartphone. This computer display device 137 can be used to implement any components of the display device for the product display as described herein, including via hardware, software program, firmware, or a combination thereof. Although only one such computer is shown, for convenience, the computer functions relating to displaying product features can be implemented in different types of computers known to those with skill in the art.

The computer display device 137, for example, includes COM ports 2208 connected to and from a network connected thereto to facilitate data communications. The computer display device 137 also includes a central processing unit (CPU) 2212, in the form of one or more processors, for executing program instructions. The exemplary computer platform includes an internal communication bus 2210, program storage and data storage of different forms, e.g., read only memory (ROM) 2214, or random access memory (RAM) 2216, for various data files to be processed and/or communicated by the computer, as well as possibly program instructions to be executed by the CPU. The computer display device 137 also includes an I/O component 2206, supporting input/output flows between the computer and other components therein such the touch screen of a computer tablet device. The computer display device 137 may also receive programming and data via network communications.

The various computerized aspects of a computer display device 137 described in connection with the disclosure herein may be implemented or performed with a processor shown as CPU 2212, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

At least some aspects of the methods described herein may be embodied in programming. Program aspects of the technology may be thought of as "products" or "articles of manufacture" typically in the form of executable code and/or associated data that is carried on, embodied in, or physically stored on a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

FIG. 29 depicts a display device used according to certain embodiments of the product display system described herein. FIG. 29(*a*) shows the front site of a tablet computer with its user interface 1008 and application icons 1030. The product application 1000 described above may be accessed through an icon 1030 from the touch screen of the interface shown in FIG. 29(*a*). FIG. 29(*b*) shows the backside of a computer tablet display device 137 with its sensor 139 or camera 141.

Figure 30:
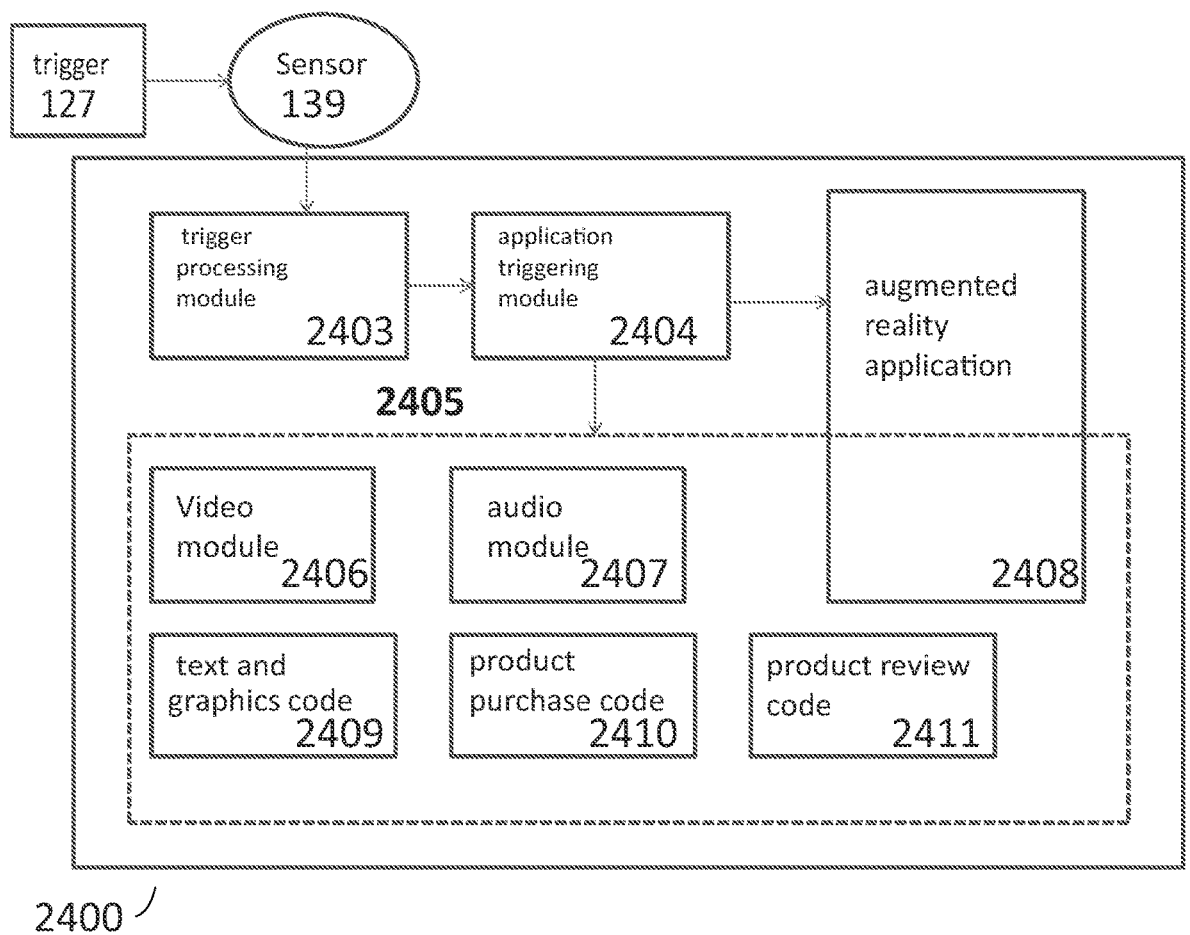
FIG. 30 depicts the computer hardware and software components of a computer display device according to certain embodiments of the invention.

FIG. 30 describes the logical hardware and software interaction of a display device 137 according to embodiments described herein. For example a product card 125 may include a symbol or trigger 127 which can be captured by sensor 139 of the computer. Once the sensor captures the trigger a signal is sent to the trigger processing module 2403 which deciphers the trigger and activates the application triggering module 2404 which may launch product application 2405. The application triggering module may also launch augmented reality application 2408 which may or may not be a part of product application 2405. Product application 2405 includes various software modules and programming for displaying user interface features of the product application described above. Video module 2406 may launch a video on a particular product, while audio module 2407 may play back sounds or music relevant to the product or product features. Product application 2405 may also include text and graphics code 2408 to display product descriptions and pictures, product purchase code 2410 to activate programming and interfaces for purchasing the product, and product review code 2411 to activate programming and interfaces for reviewing the product.

Augmented Reality Product Display Systems and Methods

As described herein in regard to FIG. 20, in one embodiment, the display device 137 can also augment reality by capturing a picture of the consumer, the consumer's hand, finger or any other aspect of the consumer and then render an image or video of the product in an augmented reality fashion to demonstrate how the watch, jewelry item or wearable electronic would look like or appear on the user. For example, the front camera of the display device 137 can capture a picture of the user's wrist and the back end camera can capture a picture of the product in question, which may be a luxury watch. The augmented reality software on the display device 137 can then transpose an image of the watch on the user's wrist and allow the user to experience and visualize what the watch would look like on the user's hand. This provides the retailer with a significant advantage of not having to have a retail sales person open up display to remove the watch or item of jewelry and attend over the consumer while the consumer tries the product. This can also prevent significant loss, theft or damage to sensitive products, all the while allowing a consumer an augmented reality experience with the product as if he were actually in possession of the product itself. The augmented reality software can be configured to provide different sizes, models, colors and other variations of a product to a user so that with a touch of button the user can experience all variations and permutation of a product without having to try each and every single model, size and color of the product. This augmented reality shopping experience can result in significant time savings for the both the consumer and the retailer and prevent lines and congestion around popular product displays.

In another embodiment of the invention, the following method is implemented in connection with the product display and computing device: (1) using a sensor to capture a symbol or logo which represents a product; (2) using an application on the display device 137 to render the product information, including graphics, images or video to the user; (3) optionally providing for a second sensor to capture an image of the user or some portion of the user; (4) augmenting the user's image or portion of the user to display the product on the user or some portion of the user in an image or video rendering of the user or portion of the user on the computing device.

Those of skill would further appreciate that the various computer instructions or methods in connection with the disclosure herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

All or portions of the software may at times be communicated through a network such as the Internet or various other telecommunication networks. Such communications, for example, may enable loading of the software from one computer or processor into another, for example the various modules and code features of product application 2405. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, data drive dynamic logging system and its components as disclosed herein can be implemented as a firmware, firmware/software combination, firmware/hardware combination, or a hardware/firmware/software combination.

Figure 31A:
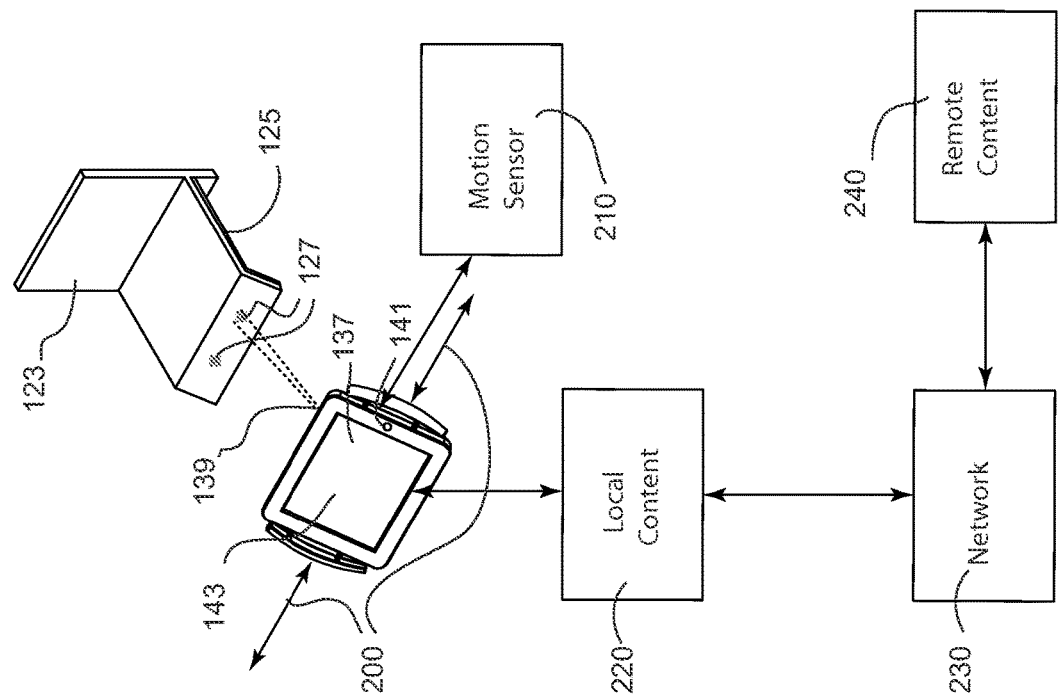
FIGS. 31A and 31B are a schematic block diagram of the variable product information display system showing two states of user input.
Figure 31B:
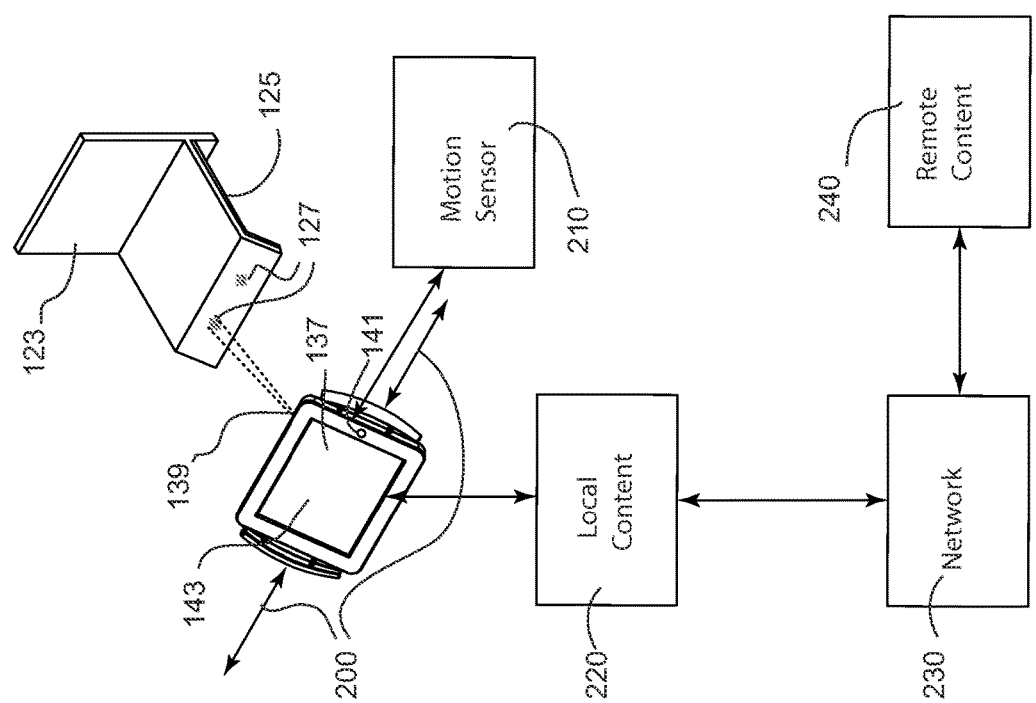

The information presented by the display device 137 may be varied by the actions of the user. FIGS. 31A and 31B is a schematic diagram of the system showing the product display card 125 behind the display card cover 123. This embodiment of the display card has two display card triggers 127 that the display device 137 is able to detect using the trigger sensor 139. The display device is shown with the trigger sensor line of view in broken lines on one of the triggers 127. The triggers represent two versions of information, example information on different models of a product or service. The display device is shown in FIG. 31A with the trigger sensor line of view on the trigger 127 to the left and in FIG. 31B with the trigger sensor line of view on the trigger 127 to the right. The user selects the information desired using the display device positioning mechanism 200, shown schematically as two dual direction arrows. The user may also select the type of content, example: specifications, explanations, operating instructions, product or service options, reviews, survey results and input, and interactive use of the product or service, all of which can be provided in the form of text, pictures, video, and audio by selecting touch screen options on the electronic display/touchpad screen 143.

The user may select the second trigger information by using the display device positioning mechanism 200 to move the display device to the position shown in FIG. 31B where the trigger sensor line of view is on the trigger 127 to the right. The user, observing the electronic display/touchpad screen 143 will find the information display moves from the first set of information to the second set by scrolling in the direction of motion of the display device positioning mechanism 200. Options on the electronic display/touchpad screen 143 provide for selection of the desired information, and/or comparison of the information between the first and second set of information, or for user input including personal information or images of the user using the user camera 141 for interaction with the product information or images.

Figure 32:
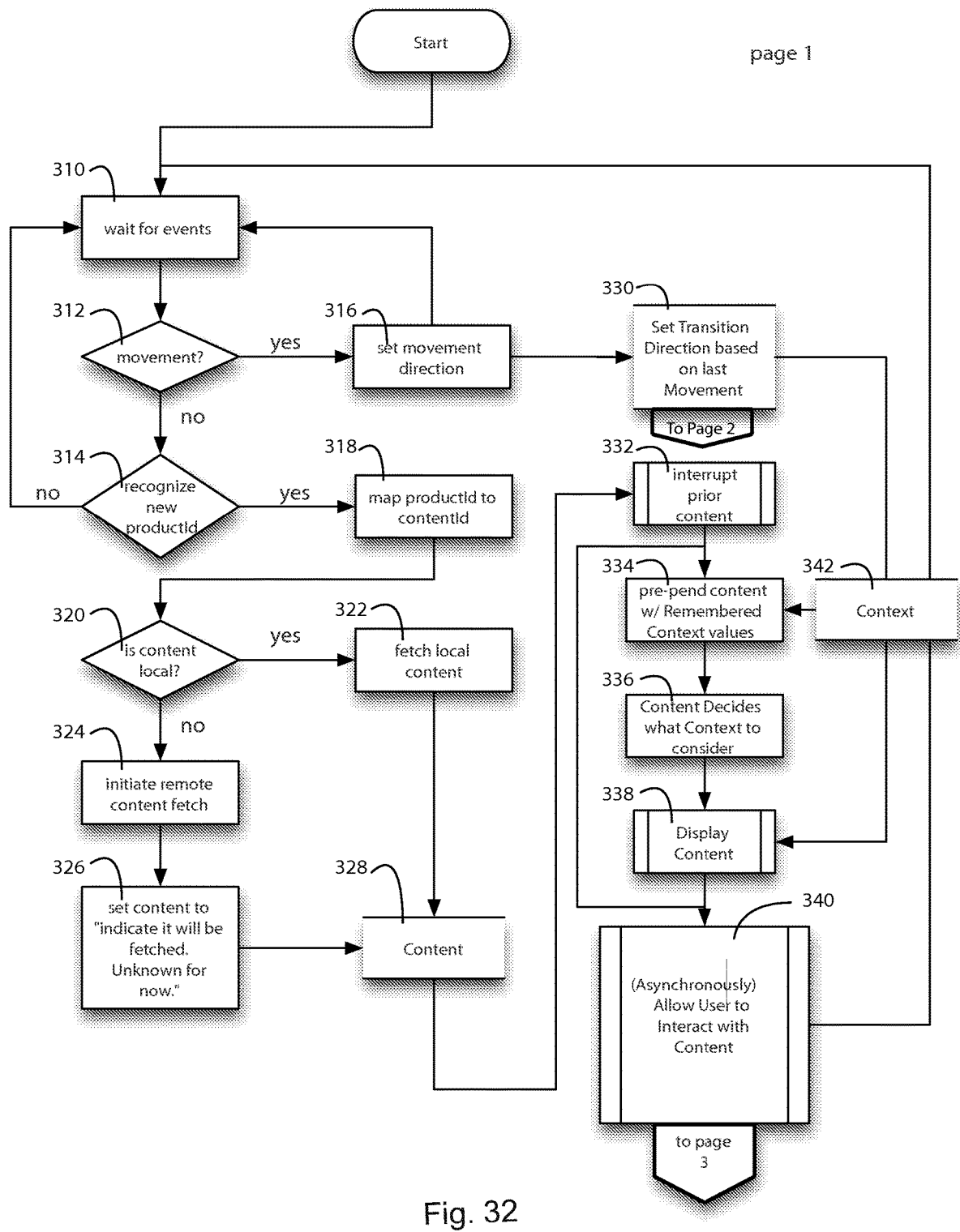
FIG. 32 is page 1 of a set of three flowcharts illustrating the operation of the display device.
Figure 33:
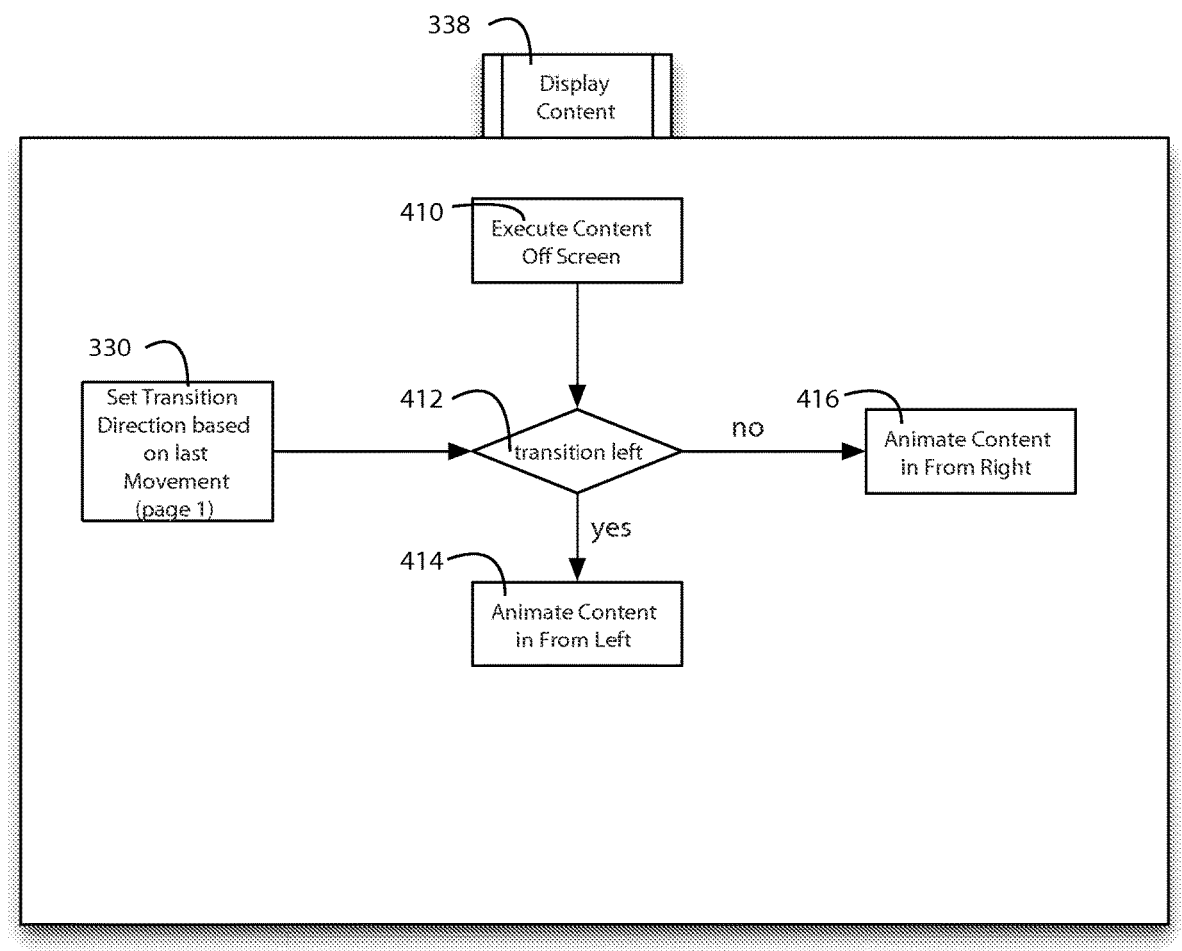
FIG. 33 is page 2 of a set of three flowcharts illustrating the operation of the display device.
Figure 34:
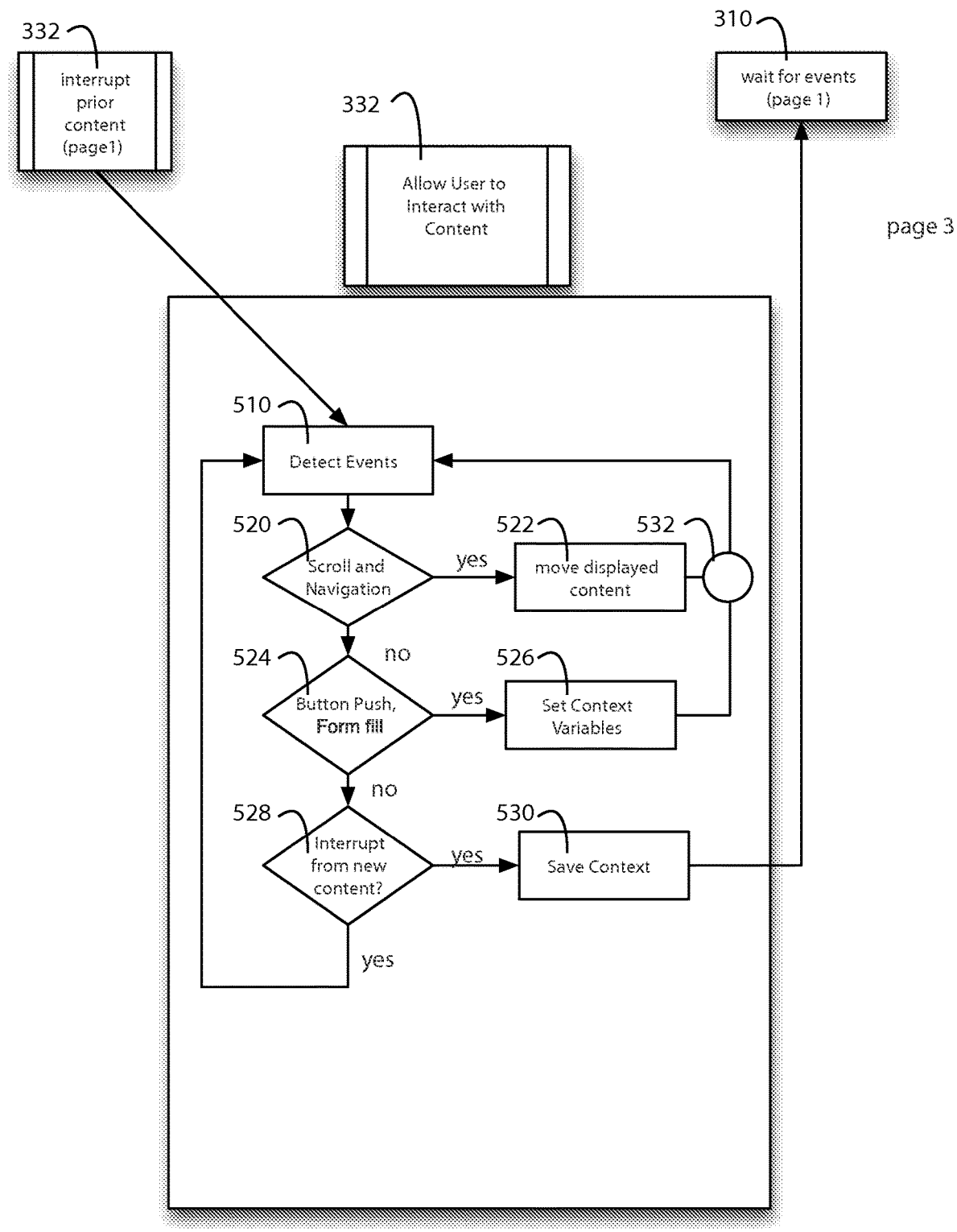
FIG. 34 is page 3 of a set of three flowcharts illustrating the operation of the display device.

FIGS. 32, 33, and 34 show the process of the triggering processing module 2403 and application triggering module 2404 presenting information on the display device 137 to the user. To start, the display device is installed in the positioning mechanism 200 and has been turned on and has available the operating system required for operation, and that process places the display device 137 in a wait mode 310. Interaction of a shopper/user with the display is normally initiated by the movement 312 of the display device using the positioning mechanism 200. This may be done in response to instructions on the display card or on the display screen in the wait mode. The movement 312 provides a first type of user input to the display device 137) Motion of the device is sensed by a motion sensor 210 internal to the device and illustrated in FIGS. 31A and 31B. The sensor may be based on the internal accelerometer, gyroscope hardware or gravity, linear acceleration, or rotation vector software based data derived from an accelerometer and/or magnetometer. This event 310 initiates the display device 137. If the display device trigger sensor 139 is near a display card trigger 127 it recognizes a productid 314 which maps to a contentid 318. If the content related to the contentid is stored locally 320, the content is fetched 322 and made the current content 328. If the contentid is not stored in the display device memory, a fetch is initiated from remote content 324. Remote content may be accessed through a network 230 as shown in FIGS. 31A and 31B, which may be a wireless connection to a remote data storage content 240. An interim screen display indicating the content is being fetched 326 may be displayed as the content 328 is made available.

Available content 322 interrupts the processing of prior content 332. When the interruption is done, the new content is executed and given the remembered context 334, which remembers the type of prior content chosen by the user. Example: type of page displayed, reviews, technical specifications, or operating instructions. The content then determines what to provide or ignore, dependent on the prior context 336, and displays 338 that content.

The display transition as the new content is displayed (338) is determined by the motion direction 316 of the positioning mechanism 200. The direction sets the transition direction 330 as part of the context 342 as shown in FIG. 33 (page 2). The new content is displayed 338 based on the transition direction 338 determined by the motion detector 210. The content is available for display 410 and depending on the motion direction, left or right in this embodiment 412 the content is animated on the screen from the left 414 or right 416.

The display device 137 allows the user to interact 332 with the new content 332 as shown in FIG. 34 (page 3). The display/touchpad 143 is used for the interaction. Interaction may be a scrolling and navigation event 520 which is responded to by changing the display accordingly 522, or interactions with user interface elements, such as push buttons or form fill requests 524, which sets variables dictated by the context 526 to change the content 528 and allow responding to these requests. These features may include input by the user using the display device user camera 141. The content is saved 530 so it may be restored upon an input 310 following the interrupt 528.

The interaction with push buttons or form fill requests 524 may also cause side effects 532 which may be, but are not limited to computations, communications including saving elements in databases, sending emails, monitoring user interaction history, etc with all the generality inherent to connected computer languages.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus for use with an electronic device that includes a frontside having an electronic display and a backside having a back camera used as a trigger sensor, the apparatus comprising:
   a frame configured to encase at least a portion of the electronic device;
   a first mirror coupled to the frame at a first location; and
   a second mirror coupled to the frame at a second location that is offset from the first location;
   the first mirror and the second mirror collectively configured to move a location of the trigger sensor from the first location to the second location that is offset from the first location;

the frame including a frame base and a top cover; and the frame base including a channel within which are located the first and the second mirrors.

2. The apparatus of claim 1, wherein:

the first location, at which the first mirror is coupled to the frame, is adjacent to the location of the back camera of the electronic device when the frame encases the at least a portion of the electronic device.

3. The apparatus of claim 2, wherein:

the first location is located near a corner of the frame; and the second location is located at a more centered location of the frame compared to the first location.

4. The apparatus of claim 1, wherein the second mirror is larger than the first mirror.

5. The apparatus of claim 1, wherein a reflective surface of the first mirror is parallel to a reflective surface of the second mirror.

6. The apparatus of claim 1, wherein a reflective surface of the first mirror and a reflective surface of the second mirror are each at a 45 degree angle relative to a major planar surface of the frame base.

7. The apparatus of claim 1, wherein:

the top cover is configured to enclose and protect an area of the electronic device outside the electronic display of the electronic device;

the frame base and the top cover are configured to be attached to one another while the electronic device is resting within the frame base; and further comprising a handle coupled to the frame and configured to enable a user to grip and maneuver the apparatus.

8. The apparatus of claim 7, wherein the electronic device also includes a front camera on the frontside of the electronic device, and wherein:

the top cover includes an opening to allow use of the front camera on the frontside of the electronic device when the frame encases the at least a portion of the electronic device.

9. An apparatus for use with an electronic device that includes a frontside having an electronic display and a backside having a back camera used as a trigger sensor, the apparatus comprising:

a frame configured to encase at least a portion of the electronic device;

a first mirror coupled to the frame at a first location;

a second mirror coupled to the frame at a second location that is offset from the first location;

the first mirror and the second mirror collectively configured to move a location of the trigger sensor from the first location to the second location that is offset from the first location; and a track follower coupled to the frame and configured to be slid along a track that is attached to or integral with a display stand to thereby enable the apparatus, and the displayed device at least a portion of which is encased by the frame of the apparatus, to be moved along the display stand in two opposing directions by a user.

10. The apparatus of claim 9, wherein:

the track follower includes wheels configured to movably connect to the track and allow motion following the track in the two opposing directions by the user.

11. A variable display system for use with an electronic device that includes a frontside having an electronic display and a backside having a back camera used as a trigger sensor, the display system comprising:

a display stand;

a track that is attached to or integral with the display stand;

an apparatus including a frame configured to encase at least a portion of the electronic device;

a first mirror coupled to the frame at a first location; and a second mirror coupled to the frame at a second location that is offset from the first location;

the first mirror and the second mirror collectively configured to move a location of the trigger sensor from the first location to the second location that is offset from the first location; and a track follower coupled to the frame and configured to be slid along the track that is attached to or integral with the display stand to thereby enable the apparatus, and the displayed device at least a portion of which is encased by the frame of the apparatus, to be moved along the display stand in two opposing directions by a user;

a plurality of product display cards arranged on the display stand and each associated with one of a plurality of products and with one or more triggering symbols;

wherein the first and the second mirrors enable the back camera of the electronic device to perceive a said triggering symbol associated with a first one of the plurality of display cards when the second mirror is positioned opposite at least one of the one or more triggering symbols associated with the first one of the plurality of display cards; and wherein the first and the second mirrors also enable the back camera of the electronic device to perceive a said triggering symbol associated with a second one of the plurality of display cards when the second mirror is positioned opposite at least one of the one or more triggering symbols associated with the second one of the plurality of display cards.

12. The system of claim 11, wherein:

the first location, at which this first mirror is coupled to the frame, is adjacent to the location of the back camera of the electronic device when the frame encases the at least a portion of the electronic device;

the first location is located near a corner of the frame; and the second location is located at a more center location of the frame compared to the first location.

13. The system of claim 11, wherein:

the frame of the apparatus includes a frame base and a top cover; and the frame base includes a channel within which are located the first and the second mirrors.

14. The system of claim 11, wherein:

the frame of the apparatus includes a frame base and a top cover;

the top cover is configured to enclose and protect an area of the electronic device outside the electronic display of the electronic device;

the frame base and the top cover are configured to be attached to one another while the electronic device is resting within the frame base; and further comprising a handle coupled to the frame and configured to enable a user to grip and maneuver the apparatus.

15. The system of claim 11, wherein the electronic device also includes a front camera on the frontside of the electronic device, and wherein:

the frame of the apparatus includes a frame base and a top cover;

the top cover includes an opening to allow use of the front camera on the frontside of the electronic device when the frame encases the at least a portion of the electronic device.

16. An apparatus for use with a tablet computer type electronic device that includes a frontside having a touchscreen electronic display and a backside having a sensor that can be used to capture data from product cards or products which are positioned at one or more places on a display stand, the apparatus comprising:
- a frame configured to hold the tablet computer type electronic device;
- a first mirror coupled to the frame at a first location that is adjacent to the sensor on the backside of the touchscreen electronic display when the frame is holding the tablet computer type electronic device; and
- a second mirror coupled to the frame at a second location that is offset from the first location;
- the first mirror and the second mirror collectively configured to enable the sensor on the backside of the touchscreen electronic display to capture data from product cards or products when the data is adjacent to the second mirror;
- the frame including a frame base and a top cover;
- the top cover configured to enclose and protect an area of the electronic device outside the touchscreen electronic display of the electronic device;
- the frame base and the top cover configured to be attached to one another while the electronic device is resting within the frame base; and
- further comprising a handle coupled to the frame and configured to enable a user to grip and maneuver the apparatus.

17. The apparatus of claim 16, wherein:
the frame base includes a channel within which are located the first and the second mirrors.

18. The apparatus of claim 17, wherein the tablet computer type electronic device also includes a front camera on the frontside thereof, and wherein:
the top cover includes an opening to allow use of the front camera on the frontside of the tablet computer type electronic device when the frame holds the tablet computer type electronic device.

19. The apparatus of claim 16, further comprising:
a track follower coupled to the frame and configured to be slid along a track that is attached to or integral with a display stand to thereby enable the apparatus, and the tablet computer type electronic device being held by the frame, to be moved along the display stand in two opposing directions by a user.

20. The apparatus of claim 19, wherein:
the track follower includes wheels configured to movably connect to the track and allow motion following the track in the two opposing directions by the user.

* * * * *